United States Patent
Wang

(10) Patent No.: US 11,958,962 B2
(45) Date of Patent: Apr. 16, 2024

(54) POLYETHYLENE HOMOPOLYMER COMPOSITIONS HAVING GOOD BARRIER PROPERTIES

(71) Applicant: NOVA CHEMICALS (INTERNATIONAL) S.A., Fribourg (CH)

(72) Inventor: XiaoChuan Wang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 574 days.

(21) Appl. No.: 17/298,904

(22) PCT Filed: Nov. 28, 2019

(86) PCT No.: PCT/IB2019/060296
§ 371 (c)(1),
(2) Date: Jun. 1, 2021

(87) PCT Pub. No.: WO2020/115623
PCT Pub. Date: Jun. 11, 2020

(65) Prior Publication Data
US 2022/0064417 A1    Mar. 3, 2022

(30) Foreign Application Priority Data

Dec. 3, 2018    (CA) .................................. CA 3026095

(51) Int. Cl.
*C08L 23/06*    (2006.01)
*B01J 19/06*    (2006.01)
(Continued)

(52) U.S. Cl.
CPC ............... *C08L 23/06* (2013.01); *B01J 19/06* (2013.01); *B01J 19/245* (2013.01); *C08J 5/18* (2013.01);
(Continued)

(58) Field of Classification Search
CPC ......... C08L 23/06; C08F 2/001; C08F 4/6592
See application file for complete search history.

(56) References Cited

U.S. PATENT DOCUMENTS 3,645,992 A    2/1972    Elston
4,701,432 A    10/1987   Welborn, Jr.
(Continued)

FOREIGN PATENT DOCUMENTS

WO    WO-2016/135590 A1    9/2016

OTHER PUBLICATIONS

International Search Report and Written Opinion corresponding to PCT/IB2019/060296, dated Feb. 12, 2020, 7 pages.
(Continued)

*Primary Examiner* — Caixia Lu
(74) *Attorney, Agent, or Firm* — Thomas J. Styslinger

(57) ABSTRACT

A polyethylene homopolymer composition comprises: a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0; wherein the ratio of the melt index, $I_2^2$ of the second ethylene homopolymer to the melt index, $I_2^1$ of the first ethylene homopolymer is at least 50. The polyethylene homopolymer compositions which may be nucleated have a weight average molecular weight, $M_w$ of ≤75,000, a high load melt index, $I_{21}$ of at least 200 g/10 min, a molecular weight distribution, $M_w/M_n$ of from 4.0 to 12.0 and may be usefully employed in molding applications, such as, for example, in compression molded closures.

41 Claims, 4 Drawing Sheets

(51) Int. Cl.
    *B01J 19/24*    (2006.01)
    *C08F 2/00*     (2006.01)
    *C08F 4/6592*   (2006.01)
    *C08J 5/18*     (2006.01)

(52) U.S. Cl.
    CPC ............ *C08F 2/001* (2013.01); *C08F 4/6592* (2013.01); *C08J 2323/06* (2013.01); *C08J 2423/06* (2013.01); *C08L 2203/16* (2013.01); *C08L 2205/025* (2013.01); *C08L 2205/24* (2013.01)

(56)             References Cited

U.S. PATENT DOCUMENTS

| | | |
|---|---|---|
| 4,808,561 A | 2/1989 | Welborn, Jr. |
| 4,935,397 A | 6/1990 | Chang |
| 4,937,301 A | 6/1990 | Chang |
| 5,055,438 A | 10/1991 | Canich |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,324,800 A | 6/1994 | Welborn et al. |
| 5,633,394 A | 5/1997 | Welborn et al. |
| 5,703,187 A | 12/1997 | Timmers |
| 6,002,033 A | 12/1999 | Razavi et al. |
| 6,034,021 A | 3/2000 | Wilson et al. |
| 6,063,879 A | 5/2000 | Stephan et al. |
| 6,114,481 A | 9/2000 | McMeeking et al. |
| 6,235,672 B1 | 5/2001 | McKay et al. |
| 6,342,463 B1 | 1/2002 | Stephan et al. |
| 6,372,864 B1 | 4/2002 | Brown |
| 6,489,413 B1 | 12/2002 | Floyd et al. |
| 6,689,847 B2 | 2/2004 | Mawson et al. |
| 6,809,154 B2 | 10/2004 | Lindahl et al. |
| 6,984,695 B2 | 1/2006 | Brown et al. |
| 7,737,220 B2 | 6/2010 | Swabey et al. |
| 8,022,143 B2 | 9/2011 | Wang |
| 8,962,755 B2 | 2/2015 | Wang et al. |
| 9,074,082 B2 | 7/2015 | Wang et al. |
| 9,221,966 B2 | 12/2015 | Wang et al. |
| 9,371,442 B2 | 6/2016 | Wang |
| 9,475,927 B2 | 10/2016 | Wang et al. |
| 9,587,093 B2 | 3/2017 | Aubee et al. |
| 9,758,653 B2 | 9/2017 | Wang et al. |
| 9,783,663 B2 | 10/2017 | Wang |
| 9,783,664 B1 | 10/2017 | Wang |
| 2006/0047078 A1* | 3/2006 | Swabey ............... C08L 23/06 525/240 |
| 2006/0247373 A1 | 11/2006 | Goyal et al. |
| 2008/0118749 A1 | 5/2008 | Aubee et al. |
| 2009/0029182 A1 | 1/2009 | Aubee et al. |
| 2011/0143155 A1 | 6/2011 | Aubee et al. |
| 2015/0203671 A1* | 7/2015 | Aubee ............... B29C 48/10 524/396 |
| 2018/0079898 A1 | 3/2018 | Wang |

OTHER PUBLICATIONS

Randall in "A Review of High Resolution Liquid Carbon Nuclear Magnetic Resonance Characterizations of Ethylene-Based Polymers", Macromol. Chem. Phys. C29 (2 and 3), p. 285.

* cited by examiner

POLYETHYLENE HOMOPOLYMER COMPOSITIONS HAVING GOOD BARRIER PROPERTIES

CROSS-REFERENCE TO RELATED PATENT APPLICATIONS

This application is a U.S. National Phase Application under 35 U.S.C. § 371 of International Application No. PCT/IB2019/060296, filed Nov. 28, 2019, which claims the benefit of priority to CA 3,026,095, filed on Dec. 3, 2018, both of which are incorporated herein by reference in their entirety.

TECHNICAL FIELD

The present disclosure describes polyethylene homopolymer compositions which provide good barrier properties when used in, for example films, or closures. The polyethylene homopolymer compositions, which may be nucleated, comprise a first ethylene homopolymer component and a second ethylene homopolymer component, each made with a single site polymerization catalyst to have a different melt index, $I_2$. The polyethylene homopolymer compositions have a relatively low weight average molecular weight.

BACKGROUND ART

A lot of work has been done to develop polyethylene compositions comprising both an ethylene copolymer and an ethylene homopolymer (or an ethylene copolymer having fewer short chain branches). When the ethylene copolymer component is of higher molecular weight than the ethylene homopolymer component (or the ethylene copolymer having fewer short chain branches), the resultant polyethylene composition is useful in end use applications which require high degrees of environmental resistance (see for example U.S. Pat. No. 6,809,154). Such end use applications include for example molded articles such as all-polyethylene closures for bottles (see for example WO 2016/135590 and U.S. Pat. Nos. 9,758,653; 9,074,082; 9,475,927; 9,783,663; 9,783,664; 8,962,755; 9,221,966; 9,371,442 and 8,022,143). Work has also been done to develop polyethylene compositions which comprise two ethylene homopolymer components where the components chosen are of relatively low and relatively high molecular weight. These ethylene homopolymer compositions, which may have a bimodal molecular weight distribution profile, have been usefully applied in the formation of films having good barrier properties (see for example U.S. Pat. Nos. 7,737,220 and 9,587,093, and U.S. Pat. Appl. Pub. Nos 2008/0118749, 2009/0029182 and 2011/0143155).

SUMMARY OF INVENTION

We now report a new ethylene homopolymer composition comprising a first ethylene homopolymer component and a second ethylene homopolymer component. The new ethylene homopolymer compositions, which may be nucleated, can be usefully employed as is in various end use applications. Alternatively, the new ethylene homopolymer compositions can be used as a polymer blend component in a polymer composition.

An embodiment of the disclosure is a polyethylene homopolymer composition, the polyethylene homopolymer composition comprising: (1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and (2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0; wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0.

In an embodiment of the disclosure, the polyethylene homopolymer composition further comprises a nucleating agent, or a mixture of nucleating agents.

In an embodiment of the disclosure, the polyethylene homopolymer composition comprises a nucleating agent which is a salt of a dicarboxylic acid compound.

In an embodiment of the disclosure, the polyethylene homopolymer composition comprises from 20 to 4000 ppm of a nucleating agent or a mixture of nucleating agents.

An embodiment of the disclosure is an injection molded article comprising the polyethylene homopolymer composition.

An embodiment of the disclosure is a compression molded article comprising the polyethylene homopolymer composition.

An embodiment of the disclosure is a closure (e.g. a closure for bottles) comprising the polyethylene homopolymer composition.

An embodiment of the disclosure is a film comprising the polyethylene homopolymer composition.

An embodiment of the disclosure is a polyethylene homopolymer composition, the polyethylene homopolymer composition comprising: (1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and (2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0; wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0; and wherein the polyethylene homopolymer composition is made by a process comprising contacting at least one single site polymerization catalyst system with ethylene under solution polymerization conditions in at least two polymerization reactors.

An embodiment of the disclosure is a process to prepare a polyethylene homopolymer composition, the polyethylene homopolymer composition comprising: (1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and (2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0; wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0; the process comprising contacting at least one single site polymerization catalyst system with ethylene under solution polymerization conditions in at least two polymerization reactors.

In an embodiment of the disclosure, the at least two polymerization reactors comprise a first reactor and a second reactor configured in series.

An embodiment of the disclosure is a polymer composition comprising from 1 to 100 percent by weight of a polyethylene homopolymer composition, the polyethylene homopolymer composition comprising: (1) 10 to 90 weight % of a first ethylene homopolymer having a density, $d^1$ of from 0.943 to 0.975 g/cm³, a melt index, $I_2^1$ of from 0.01 to 10 g/10 min, and a molecular weight distribution, $M_w/M_n$ of less than 3.0; and (2) 90 to 10 weight % of a second ethylene homopolymer having a density, $d^2$ of from 0.950 to 0.985 g/cm³, a melt index, $I_2^2$ of at least 500 g/10 min, and a molecular weight distribution, $M_w/M_n$ of less than 3.0; wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0.

BRIEF DESCRIPTION OF DRAWINGS

FIG. 2 also shows the oxygen transmission rates (OTR) of compression molded films made from comparative nucleated polyethylene compositions (Examples 3 and 4) vs. the weight average molecular weight (Mw) of the comparative nucleated polyethylene compositions (Examples 3 and 4).

FIG. 3 also shows the water vapor transmission rates (WVTR) of compression molded films made from comparative nucleated polyethylene compositions (Examples 3 and 4) vs. the weight average molecular weight (Mw) of the comparative nucleated polyethylene compositions (Examples 3 and 4).

FIG. 4 also shows the oxygen transmission rates (OTR) of injection molded closures made from comparative nucleated polyethylene compositions (Examples 3 and 4) vs. the weight average molecular weight (Mw) of the comparative nucleated polyethylene compositions (Examples 3 and 4).

DESCRIPTION OF EMBODIMENTS

Figure 1:
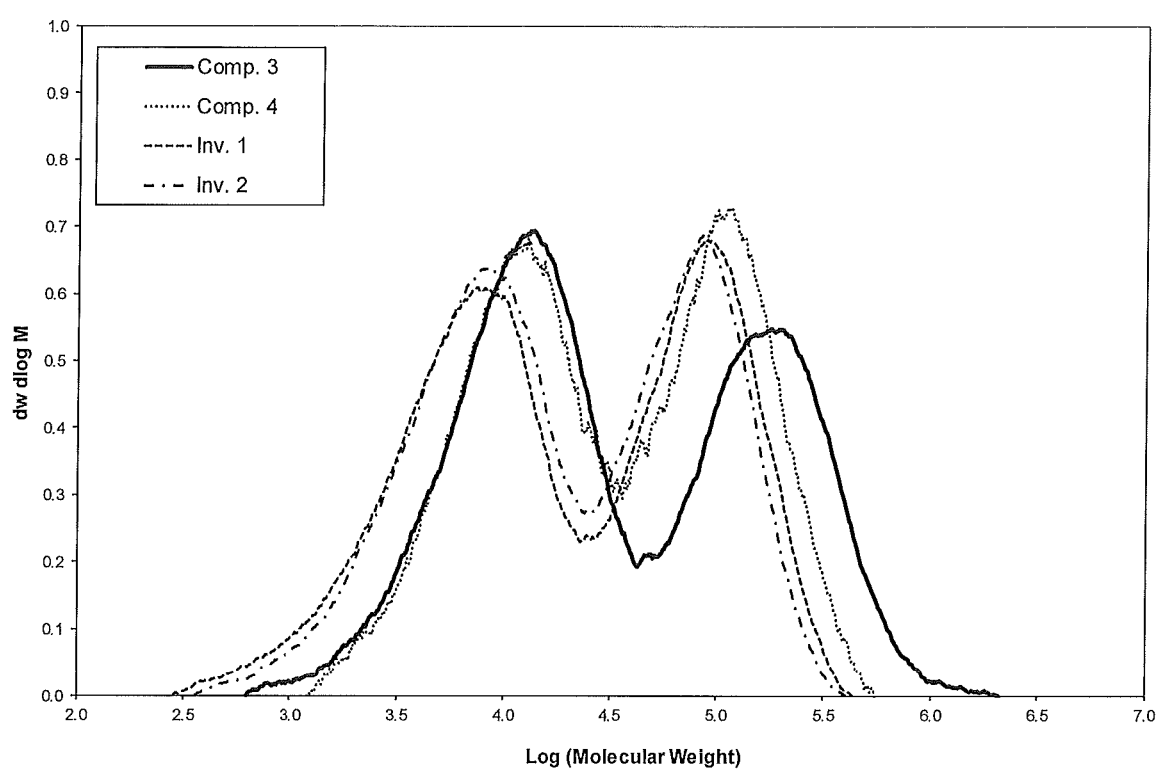
FIG. 1 shows the gel permeation chromatographs (GPC) with refractive index detection of polyethylene compositions (Examples 1 and 2) made according to the present disclosure and for two comparative polyethylene compositions (Example 3 and 4).

By the terms "ethylene homopolymer" or "polyethylene homopolymer", or "ethylene homopolymer composition" it is meant that the polymer referred to is the product of a polymerization process, where only ethylene was deliberately added as a polymerizable olefin. In contrast, the terms "ethylene copolymer" or "polyethylene copolymer", or "polyethylene copolymer composition" mean that the polymer referred to is the product of a polymerization process, where ethylene and one or more than one alpha olefin comonomer were deliberately added as polymerizable olefins.

The term "unimodal" is herein defined to mean there will be only one significant peak or maximum evident in a GPC-curve. A unimodal profile includes a broad unimodal profile. Alternatively, the term "unimodal" connotes the presence of a single maxima in a molecular weight distribution curve generated according to the method of ASTM D6474-99. In contrast, by the term "bimodal" it is meant that there will be a secondary peak or shoulder evident in a GPC-curve which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the disclosure a polymer composition comprises from 1 to 100 percent by weight of a polyethylene homopolymer composition.

In an embodiment of the disclosure, a polyethylene homopolymer composition comprises two components, (1) a first ethylene homopolymer; and (2) a second ethylene homopolymer which is different from the first homopolymer.

In an embodiment of the disclosure, a polyethylene homopolymer composition comprises only two polymer components, (1) a first ethylene homopolymer; and (2) a second ethylene homopolymer which is different from the first homopolymer.

In an embodiment of the disclosure, a polyethylene homopolymer composition further comprises a nucleating agent.

The first and second ethylene homopolymers are defined further below.

The First Ethylene Homopolymer

In an embodiment of the disclosure the first ethylene homopolymer is made using a single site polymerization catalyst.

In an embodiment of the disclosure the first ethylene homopolymer is made using a single site polymerization catalyst in a solution phase polymerization process.

In an embodiment of the disclosure the first ethylene homopolymer is made using a single site polymerization catalyst to polymerize only ethylene as a deliberately added monomer in a solution phase polymerization process.

In an embodiment of the disclosure, the melt index, $I_2^1$ of the first ethylene homopolymer is less than the melt index, $I_2^2$ of second ethylene homopolymer.

In embodiments of the disclosure the first ethylene homopolymer has a melt index, $I_2^1$ of $\leq 20.0$ g/10 min, or $\leq 15.0$ g/10 min, or $\leq 10.0$ g/10 min. In another embodiment of the disclosure, the first ethylene homopolymer has a melt index, $I_2^1$ of from 0.01 to 15.0 g/10 min, including any narrower ranges within this range and any values encompassed by these ranges. For example, in embodiments of the disclosure, the melt index, $I_2^1$ of the first ethylene homopolymer may be from 0.01 to 10.0 g/10 min, or from 0.01 to 7.5 g/10 min, or from 0.01 to 5.0 g/10 min, or from 0.01 to 3.0 g/10 min, or from 0.1 to 15.0 g/10 min, or from 0.1 to 10.0 g/10 min, or from 0.1 to 5.0 g/10 min, or from 0.1 to 3.0 g/10 min.

In an embodiment of the disclosure, the first ethylene homopolymer has a melt flow ratio, $I_{21}/I_2$ of less than 25, or less than 23, or less than 20.

In an embodiment of the disclosure, the first ethylene homopolymer has a weight average molecular weight, Mw of from 40,000 to 250,000 g/mol, including any narrower ranges within this range and any values encompassed by these ranges. For example, in embodiments of the disclosure, the first ethylene homopolymer has a weight average molecular weight, Mw of from 50,000 to 200,000 g/mol, or from 60,000 to 175,000 g/mol, or from 60,000 to 150,000 g/mol, or from 50,000 to 150,000 g/mol, or from 50,000 to 130,000 g/mol, or from 60,000 to 130,000 g/mol.

In embodiments of the disclosure, the first ethylene homopolymer has a molecular weight distribution, $M_w/M_n$ of 3.0, or <3.0, or $\leq 2.7$, or <2.7, or $\leq 2.5$, or <2.5, or $\leq 2.3$, or <2.3, or $\leq 2.1$, or <2.1 or about 2. In another embodiment of the disclosure, the first ethylene homopolymer has a molecular weight distribution, $M_w/M_n$ of from 1.7 to 3.0, including any narrower ranges within this range and any values encompassed by these ranges. For example, in embodiments of the disclosure, the first ethylene homopolymer has a molecular weight distribution, $M_w/M_n$ of from 1.8 to 2.7, or from 1.8 to 2.5, or from 1.8 to 2.3, or from 1.9 to 2.1.

In an embodiment of the disclosure, the density, $d^1$ of the first homopolymer is less than the density, $d^2$ of the second ethylene homopolymer.

In an embodiment of the disclosure, the first ethylene homopolymer has a density, $d^1$ of from 0.930 to 0.985 g/cm³, including any narrower ranges within this range and any values encompassed by these ranges. For example, in embodiments of the disclosure, the first ethylene homopolymer has a density, $d^1$ of from 0.930 to 0.980 g/cm³, or from 0.930 to 0.975 g/cm³, or from 0.935 to 0.980 g/cm³, or from 0.940 to 0.980 g/cm³, or from 0.940 to 0.975 g/cm³, or from 0.943 to 0.980 g/cm³, or from 0.943 to 0.975 g/cm³, or from 0.943 to 0.970 g/cm³, or from 0.943 to 0.965 g/cm³, or from 0.945 to 0.980 g/cm³, or from 0.945 to 0.975 g/cm³, or from 0.945 to 0.970 g/cm³, or from 0.945 to 0.965 g/cm³, or from 0.946 to 0.980 g/cm³, or from 0.946 to 0.975 g/cm³, or from 0.946 to 0.970 g/cm³, or from 0.946 to 0.965 g/cm³, or from 0.940 to 0.962 g/cm³, or from 0.940 to 0.960 g/cm³, or from 0.943 to 0.962 g/cm³.

In embodiments of the disclosure, the weight percent (wt %) of the first ethylene homopolymer in the polyethylene homopolymer composition (i.e. the weight percent of the first ethylene homopolymer based on the total weight of the first and second ethylene homopolymers) may be from about 5 wt % to about 95 wt %, including any narrower ranges within this range and any values encompassed by these ranges. For example, in embodiments of the disclosure, the weight percent (wt %) of the first ethylene homopolymer in the polyethylene homopolymer composition may be from about 5 wt % to about 90 wt %, or from about 10 wt % to about 90 wt %, or from about 15 to about 80 wt %, or from about 20 wt % to about 80 wt %, or from about 25 wt % to about 75 wt %, or from about 30 wt % to about 70 wt %, or from about 35 wt % to about 65 wt %, or from about 40 wt % to about 70 wt %, or from about 45 wt % to about 65 wt %, or from about 50 wt % to about 60 wt %.

The Second Ethylene Homopolymer

In an embodiment of the disclosure the second ethylene homopolymer is made using a single site polymerization catalyst.

In an embodiment of the disclosure the second ethylene homopolymer is made using a single site polymerization catalyst in a solution phase polymerization process.

In an embodiment of the disclosure the second ethylene homopolymer is made using a single site polymerization catalyst to polymerize only ethylene as a deliberately added monomer in a solution phase polymerization process.

In an embodiment of the disclosure, the melt index, $I_2^2$ of the second ethylene homopolymer is greater than the melt index, $I_2^1$ of first ethylene homopolymer.

In embodiments of the disclosure, the ratio of the melt index, $I_2^2$ of the second ethylene homopolymer to the melt index, $I_2^1$ of the first ethylene homopolymer is at least 25, or at least 50, or at least 100, or at least 1,000, or at least 5,000, or at least 7,500.

In an embodiment of the disclosure, the ratio of the melt index, $I_2^2$ of the second ethylene homopolymer to the melt index, $I_2^1$ of the first ethylene homopolymer is from 25 to 30,000, including any narrower ranges within this range and any values encompassed by these ranges. For example, in embodiments of the disclosure, the ratio of the melt index, $I_2^2$ of the second ethylene homopolymer to the melt index, $I_2^1$ of the first ethylene homopolymer may be from 50 to 30,000, or from 100 to 30,000, or from 1000 to 30,000, or from 5,000 to 30,000, or from 50 to 25,000, or from 100 to 25,000, or from 1,000 to 25,000, or from 5,000 to 25,000, or from 7,500 to 30,000, or from 7,500 to 25,000.

In embodiments of the disclosure the second ethylene homopolymer has a melt index, $I_2^2$ of at least 250 g/10 min, or at least 500 g/10 min, or at least 1,000 g/10 min, or at least 5,000 g/10 min, or at least 7,500 g/10 min, or at least 10,000 g/10 min. In another embodiment of the disclosure, the second ethylene homopolymer has a melt index, $I_2^2$ of from 250 to 20,000 g/10 min, including any narrower ranges within this range and any values encompassed by these ranges. For example, in embodiments of the disclosure, the melt index, $I_2^2$ of the second ethylene homopolymer may be from 500 to 15,000 g/10 min, or from 1000 to 17,500 g/10 min, or from 2,500 to 20,000 g/10 min, or from 5,000 to 20,000 g/10 min, or from 5,000 to 17,500 g/10 min, or from 1000 to 20,000 g/10 min, or from 2,500 to 17,500 g/10 min, or from 7,500 to 20,000 g/10 min, or from 7,500 to 17,500 g/10 min, or from 7,500 to 15,000 g/10 min, or from 5,000 to 15,000 g/10 min.

In an embodiment of the disclosure, the second ethylene homopolymer has a melt flow ratio, $I_{21}/I_2$ of less than 25, or less than 23, or less than 20.

In an embodiment of the disclosure, the second ethylene homopolymer has a weight average molecular weight, Mw of $\leq 65,000$ g/mol, or $\leq 55,000$ g/mol, or $\leq 45,000$ g/mol, or $\leq 35,000$ g/mol, or $\leq 25,000$ g/mol, or $\leq 15,000$ g/mol, or $\leq 10,000$ g/mol. In another embodiment the second ethylene homopolymer has a weight average molecular weight, Mw of from 2,500 to 70,000 g/mol, including any narrower ranges within this range and any values encompassed by these ranges. For example, in embodiments of the disclosure, the second ethylene homopolymer has a weight average molecular weight, Mw of from 2,500 to 60,000 g/mol, or from 2,500 to 50,000 g/mol, or from 2,500 to 40,000 g/mol, or from 2,500 to 30,000 g/mol, or from 2,500 to 20,000 g/mol, or from 2,500 to 15,000 g/mol, or from 5,000 to 30,000 g/mol, or from 5,000 to 20,000 g/mol, or from 5,000 to 25,000 g/mol, or from 2,500 to 25,000 g/mol.

In embodiments of the disclosure, the second ethylene homopolymer has a molecular weight distribution, $M_w/M_n$ of ≤3.0, or <3.0, or ≤2.7, or <2.7, or ≤2.5, or <2.5, or ≤2.3, or <2.3, or ≤2.1, or <2.1 or about 2. In another embodiment of the disclosure, the second ethylene homopolymer has a molecular weight distribution, $M_w/M_n$ of from 1.7 to 3.0, including any narrower ranges within this range and any values encompassed by these ranges. For example, in embodiments of the disclosure, the second ethylene homopolymer has a molecular weight distribution, $M_w/M_n$ of from 1.8 to 2.7, or from 1.8 to 2.5, or from 1.8 to 2.3, or from 1.9 to 2.1.

In an embodiment of the disclosure, the density, $d^2$ of the second homopolymer is greater than the density, $d^1$ of the first ethylene homopolymer.

In an embodiment of the disclosure, the density, $d^2$ of the second ethylene homopolymer is less than 0.035 g/cm$^3$ greater than the density, $d^1$ of the first ethylene homopolymer. In an embodiment of the disclosure, the density, $d^2$ of the second ethylene homopolymer is less than 0.030 g/cm$^3$ greater than the density, $d^1$ of the first ethylene homopolymer. In an embodiment of the disclosure, the density, $d^2$ of the second ethylene homopolymer is less than 0.025 g/cm$^3$ greater than the density, $d^1$ of the first ethylene homopolymer.

In an embodiment of the disclosure, the second ethylene homopolymer has a density, $d^2$ of from 0.940 to 0.985 g/cm$^3$, including any narrower ranges within this range and any values encompassed by these ranges. For example, in embodiments of the disclosure, the second ethylene homopolymer has a density, $d^2$ of from 0.943 to 0.985 g/cm$^3$, or from 0.945 to 0.985 g/cm$^3$, or from 0.950 to 0.985 g/cm$^3$, or from 0.950 to 0.980 g/cm$^3$, or from 0.953 to 0.985 g/cm$^3$, or from 0.953 to 0.980 g/cm$^3$, or from 0.955 to 0.985 g/cm$^3$, or from 0.955 to 0.980 g/cm$^3$, or from 0.955 to 0.975 g/cm$^3$, or from 0.950 to 0.975 g/cm$^3$, or from 0.957 to 0.985 g/cm$^3$, or from 0.957 to 0.980 g/cm$^3$, or from 0.957 to 0.975 g/cm$^3$, or from 0.959 to 0.985 g/cm$^3$, or from 0.959 to 0.980 g/cm$^3$, or from 0.959 to 0.975 g/cm$^3$.

In embodiments of the disclosure, the weight percent (wt %) of the second ethylene homopolymer in the polyethylene homopolymer composition (i.e. the weight percent of the second ethylene homopolymer based on the total weight of the first and second ethylene homopolymers) may be from about 5 wt % to about 95 wt %, including any narrower ranges within this range and any values encompassed by these ranges. For example, in embodiments of the disclosure, the weight percent (wt %) of the second ethylene homopolymer in the polyethylene homopolymer composition may be from about 5 wt % to about 90 wt %, or from about 10 wt % to about 90 wt %, or from about 15 to about 80 wt %, or from about 20 wt % to about 80 wt %, or from about 25 wt % to about 75 wt %, or from about 30 wt % to about 70 wt %, or from about 35 wt % to about 65 wt %, or from about 35 wt % to about 60 wt %, or from about 35 wt % to about 55 wt %, or from about 40 wt % to about 55 wt %, or from about 40 wt % to about 50 wt %.

The Polyethylene Homopolymer Composition

In an embodiment of the disclosure, the polyethylene homopolymer composition will comprise a first ethylene homopolymer and a second ethylene homopolymer (each as defined herein).

In an embodiment of the disclosure, the polyethylene homopolymer composition has a bimodal profile (i.e. molecular weight distribution) in a gel permeation chromatography (GPC) analysis.

In an embodiment of the disclosure, the polyethylene composition has a bimodal profile in a gel permeation chromatograph generated according to the method of ASTM D6474-99.

In an embodiment of the disclosure, the polyethylene homopolymer composition has a weight average molecular weight, $M_W$ of ≤100,000 g/mol, or ≤75,000 g/mol, or <70,000 g/mol, or ≤65,000 g/mol, or <65,000 g/mol or ≤60,000 g/mol, or <60,000 g/mol. In another embodiment, the polyethylene homopolymer composition has a weight average molecular weight, $M_W$ of from 10,000 to 75,000 g/mol, including any narrower ranges within this range and any values encompassed by these ranges. For example, in embodiments of the disclosure, the polyethylene homopolymer composition has a weight average molecular weight, $M_W$ of from 15,000 to 75,000 g/mol, or from 15,000 to 70,000 g/mol, or from 20,000 to 75,000 g/mol, or from 25,000 to 75,000 g/mol, or from 30,000 to 75,000 g/mol, or from 25,000 to 70,000 g/mol, or from 25,000 to 65,000 g/mol, or from 25,000 to 60,000 g/mol, or from 30,000 to 75,000 g/mol, or from 30,000 to 70,000 g/mol, or from 30,000 to 65,000 g/mol, or from 35,000 to 75,000 g/mol, or from 35,000 to 70,000 g/mol, or from 35,000 to 65,000 g/mol.

In an embodiment of the disclosure, the polyethylene homopolymer composition has a number average molecular weight, $M_n$ of ≤50,000 g/mol, or ≤40,000 g/mol, or <40,000 g/mol, or ≤30,000 g/mol, or <30,000 g/mol, or ≤20,000 g/mol, or <20,000 g/mol, or ≤15,000 g/mol, or <15,000 g/mol, or ≤10,000 g/mol, or <10,000 g/mol. In another embodiment of the disclosure, the polyethylene homopolymer composition has a number average molecular weight, $M_n$ of from 1,000 to 50,000 g/mol, including any narrower ranges within this range and any values encompassed by these ranges. For example, in embodiments of the disclosure, the polyethylene homopolymer composition has a number average molecular weight, $M_n$ of from 1,000 to 40,000 g/mol, or from 1,000 to 30,000 g/mol, or from 1,000 to 20,000 g/mol, or from 1,000 to 15,000 g/mol, or from 1,000 to 10,000 g/mol, or from 2,500 to 35,000 g/mol, or from 2,500 to 30,000 g/mol, or from 2,500 to 25,000 g/mol, or from 2,500 to 20,000 g/mol, or from 2,500 to 15,000 g/mol, or from 2,500 to 10,000 g/mol, or from 5,000 to 35,000 g/mol, or from 5,000 to 30,000 g/mol, or from 5,000 to 25,000 g/mol, or from 5,000 to 20,000 g/mol, or from 5,000 to 15,000 g/mol, or from 5,000 to 10,000 g/mol.

In embodiments of the disclosure, the polyethylene homopolymer composition has a molecular weight distribution, $M_w/M_n$ of from 3.0 to 15.0, including any narrower ranges within this range and any values encompassed by these ranges. For example, in embodiments of the disclosure, the polyethylene homopolymer composition has a molecular weight distribution, $M_w/M_n$ of from 3.5 to 15.0, or from 3.0 to 12.0, or from 4.0 to 15.0, or from 4.0 to 12.0, or from 4.0 to 10.0, or from 4.0 to 9.0.

In an embodiment of the disclosure, the polyethylene homopolymer composition has a density of from 0.943 to 0.987 g/cm$^3$, including any narrower ranges within this range and any values encompassed by these ranges. For example, in embodiments of the disclosure, the polyethylene homopolymer composition has a density of from 0.945 to 0.985 g/cm³, or from 0.947 to 0.985 g/cm³, or from 0.950 to 0.985 g/cm³, or from 0.953 to 0.985 g/cm³, or from 0.955 to 0.985 g/cm³, or from 0.961 to 0.085 g/cm³, or from 0.945 to 0.980 g/cm³, or from 0.947 to 0.980 g/cm³, or from 0.950 to 0.980 g/cm³, or from 0.951 to 0.980 g/cm³, or from 0.953 to 0.980 g/cm³, or from 0.955 to 0.980 g/cm³, or from 0.961 to 0.980 g/cm³, or from 0.945 to 0.975 g/cm³, or from 0.947 to 0.975 g/cm³, or from 0.950 to 0.975 g/cm³, or from 0.951 to 0.975 g/cm³, or from 0.953 to 0.975 g/cm³, or from 0.955 to 0.975 g/cm³, or from 0.961 to 0.975 g/cm³, or from 0.945 to 0.970 g/cm³, or from 0.947 to 0.970 g/cm³, or from 0.950 to 0.970 g/cm³, or from 0.951 to 0.970 g/cm³, or from 0.953 to 0.970 g/cm³, or from 0.955 to 0.970 g/cm³, or from 0.961 to 0.970 g/cm³.

In embodiments of the disclosure, the polyethylene homopolymer composition has a density of ≥0.950 g/cm³, or >0.950 g/cm³, or ≥0.955 g/cm³, or >0.955 g/cm³, or ≥0.960 g/cm³, or >0.960 g/cm³, or ≥0.965 g/cm³, or >0.965 g/cm³.

In embodiments of the disclosure the polyethylene homopolymer composition has a melt index, $I_2$ of at least 1.0 g/10 min (≥1.0 g/10 min), or at least 3.0 g/10 min (≥3.0 g/10 min), or at least 5.0 g/10 min (≥5.0 g/10 min), or at least 7.5 g/10 min (≥7.5 g/10 min), or at least 10.0 g/10 min (≥10.0 g/10 min), or greater than 3.0 g/10 min (>3.0 g/10 min), or greater than 5.0 g/10 min (>5.0 g/10 min), or greater than 7.5 g/10 min (>7.5 g/10 min), or greater than 10.0 g/10 min (>10.0 g/10 min). In another embodiment of the disclosure, the polyethylene homopolymer composition has a melt index, $I_2$ of from 1.0 to 250 g/10 min, including any narrower ranges within this range and any values encompassed by these ranges. For example, in embodiments of the disclosure, the melt index, $I_2$ of the polyethylene homopolymer composition may be from 1.0 to 200 g/10 min, or from 1.0 to 150 g/10 min, or from 1 to 100 g/10 min, or from 1 to 50 g/10 min, or from 10.0 to 200 g/10 min, or from 10.0 to 150 g/10 min, or from 10.0 to 100 g/10 min, or from 10.0 to 50 g/10 min, or from 7.5 to 200 g/10 min, or from 7.5 to 150 g/10 min, or from 7.5 to 100 g/10 min, or from 7.5 to 50 g/10 min, or from 5.0 to 200 g/10 min, or from 5.0 to 150 g/10 min, or from 5.0 to 100 g/10 min, or from 5.0 to 75 g/10 min, or from 5.0 to 50 g/10 min, or from 5.0 to 40 g/10 min, or from 3.0 to 100 g/10 min, or from 3.0 to 75 g/10 min, or from 3.0 to 50 g/10 min, or from 3.0 to 40 g/10 min, or from 7.5 to 40 g/10 min, or from 7.5 to 30 g/10 min.

In embodiments of the disclosure the polyethylene homopolymer composition has a high load melt index, $I_{21}$ of at least 200 g/10 min (≥200 g/10 min), or at least 250 g/10 min (≥250 g/10 min), or at least 300 g/10 min (≥300 g/10 min), or at least 350 g/10 min (≥350 g/10 min), or at least 400 g/10 min (≥400 g/10 min), or greater than 200 g/10 min (>200 g/10 min), or greater than 250 g/10 min (>250 g/10 min), or greater than 300 g/10 min (>300 g/10 min), or greater than 350 g/10 min (>350 g/10 min), or greater than 400 g/10 min (>400 g/10 min). In another embodiment of the disclosure, the polyethylene homopolymer composition has a high load melt index, $I_{21}$ of from 200 to 2500 g/10 min, including any narrower ranges within this range and any values encompassed by these ranges. For example, in embodiments of the disclosure, the high load melt index, $I_{21}$ of the polyethylene homopolymer composition may be from 200 to 2,000 g/10 min, or from 200 to 1,500 g/10 min, from 200 to 1,000 g/10 min, or from 200 to 800 g/10 min.

In embodiments of the disclosure the polyethylene homopolymer composition has a melt flow ratio, $I_{21}/I_2$ of 50, or <50, or ≤45, or <40, or ≤35, or <35. In another embodiment of the disclosure, the polyethylene homopolymer composition has a melt flow ratio, $I_{21}/I_2$ of from 12 to 75, including any narrower ranges within this range and any values encompassed by these ranges. For example, in embodiments of the disclosure, the polyethylene homopolymer composition has a melt flow ratio, $I_{21}/I_2$ of from 14 to 60, or from 14 to 50, or from 16 to 40, or from 18 to 50, or from 18 to 40, or from 20 to 50, or from 20 to 45, or from 20 to 40.

In an embodiment of the disclosure, the polyethylene homopolymer composition has a stress exponent, defined as $Log_{10}$ $[I_6/I_2]/Log_{10}$ [6.48/2.16], which is ≤1.40. In further embodiments of the disclosure the polyethylene composition has a stress exponent, $Log_{10}$ $[I_6/I_2]/Log_{10}$ [6.48/2.16] of less than 1.38, or less than 1.36, or less than 1.34, or less than 1.32, or less than 1.30, or less than 1.28.

In an embodiment of the disclosure, the polyethylene homopolymer composition has a shear viscosity at about $10^5$ $s^{-1}$ (240° C.) of less than about 8 Pa·s. In an embodiment of the disclosure, the polyethylene homopolymer composition has a shear viscosity at about $10^5$ $s^{-1}$ (240° C.) of from about 1 to about 8 Pa·s including any narrower ranges within this range and any values encompassed by these ranges. For example, in embodiments of the disclosure, the polyethylene homopolymer composition has a shear viscosity at about $10^5$ $s^{-1}$ (240° C.) of from about 2 to about 6 Pa·s, or from about 2 to about 5 Pa·s, or from about 3 to about 5 Pa·s.

In an embodiment of the invention, the shear viscosity ratio, SVR (100,100000) at 240° C. of the polyethylene homopolymer composition can be from about 10 to about 80, including any narrower ranges within this range and any values encompassed by these ranges. For example, in embodiments of the disclosure, the shear viscosity ratio, SVR (100,100000) at 240° C. of the polyethylene homopolymer composition can be from about 20 to about 80, or from about 30 to about 80, or from about 20 to about 70, or from about 30 to about 70.

In an embodiment of the disclosure, the polyethylene homopolymer composition has a hexane extractable value of ≤5.5 weight percent, or less than 4.5 wt %, or less than 3.5 wt %, or less than 2.5 wt %, or less than 2.0 wt %, or less than 1.5 wt %, or less than 1.0 wt %, or less than 0.75 wt %.

In an embodiment of the disclosure, the polyethylene homopolymer composition or a molded article (or plaque) made from the polyethylene homopolymer composition, has an environment stress crack resistance ESCR Condition B at 100% of fewer than 50 hours, or fewer than 40 hours, or fewer than 30 hours, or fewer than 20 hours, or fewer than 10 hours, or fewer than 5 hours, as measured according to ASTM D1693 (at 100% IGEPAL and 50° C. under condition B).

The polyethylene homopolymer composition of this disclosure can be made using any conventional blending method such as but not limited to physical blending and in-situ blending by polymerization in multi reactor systems. For example, it is possible to perform the mixing of the first ethylene homopolymer with the second ethylene homopolymer by molten mixing of the two preformed polymers. Preferred are processes in which the first and second ethylene homopolymers are prepared in at least two sequential polymerization stages, however, both in-series or an in-parallel dual reactor process are contemplated for use in the current disclosure. Gas phase, slurry phase or solution phase reactor systems may be used, with solution phase reactor systems being preferred.

Mixed catalyst single reactor systems may also be employed to make the polyethylene homopolymer compositions of the present disclosure.

In an embodiment of the current disclosure, a dual reactor solution polymerization process is used as has been described in for example U.S. Pat. No. 6,372,864 and U.S. Pat. Appl. No. 20060247373A1 which are incorporated herein by reference.

Generally, the catalysts used in the current disclosure will be so called single site catalysts based on a group 4 metal having at least one cyclopentadienyl ligand. Examples of such catalysts which include metallocenes, constrained geometry catalysts and phosphinimine catalysts are typically used in combination with activators selected from methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such single site catalysts are distinguished from traditional Ziegler-Natta or Phillips catalysts which are also well known in the art. In general, single site catalysts produce ethylene homopolymers having a molecular weight distribution ($M_w/M_n$) of less than about 3.0, or in some cases less than about 2.5.

In embodiments of the disclosure, a single site catalyst which gives an ethylene homopolymer having a molecular weight distribution ($M_w/M_n$) of less than about 3.0, or less than about 2.7, or less than about 2.5, is used in the preparation of each of the first and the second ethylene homopolymers.

In an embodiment of the disclosure, the first and second ethylene homopolymers are prepared using an organometallic complex of a group 3, 4 or 5 metal that is further characterized as having a phosphinimine ligand. Such a complex, when active toward olefin polymerization, is known generally as a phosphinimine (polymerization) catalyst. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety.

In an embodiment of the disclosure, use of a single site catalyst that does not produce long chain branching (LCB) is preferred. Hexyl (C6) branches detected by NMR are excluded from the definition of a long chain branch in the present disclosure.

Without wishing to be bound by any single theory, long chain branching can increase viscosity at low shear rates, thereby negatively impacting cycle times during the manufacture of caps and closures, such as during the process of compression molding. Long chain branching may be determined using $^{13}C$ NMR methods and may be quantitatively assessed using the method disclosed by Randall in Rev. Macromol. Chem. Phys. C29 (2 and 3), p. 285.

In an embodiment of the disclosure, the polyethylene homopolymer composition will contain fewer than 0.3 long chain branches per 1000 carbon atoms. In another embodiment of the disclosure, the polyethylene homopolymer composition will contain fewer than 0.01 long chain branches per 1000 carbon atoms.

In an embodiment of the disclosure, the polyethylene homopolymer composition (defined as above) is prepared by contacting only ethylene as a polymerizable monomer with a polymerization catalyst under solution phase polymerization conditions in at least two polymerization reactors (for an example of solution phase polymerization conditions see for example U.S. Pat. Nos. 6,372,864; 6,984,695 and U.S. App. No. 20060247373A1 which are incorporated herein by reference).

In an embodiment of the disclosure, the polyethylene homopolymer composition is prepared by contacting at least one single site polymerization catalyst system (comprising at least one single site catalyst and at least one activator) with only ethylene as a polymerizable monomer under solution polymerization conditions in at least two polymerization reactors.

In an embodiment of the disclosure, a group 4 single site catalyst system, comprising a single site catalyst and an activator, is used in a solution phase dual reactor system to prepare a polyethylene homopolymer composition by polymerization of ethylene.

In an embodiment of the disclosure, a group 4 phosphinimine catalyst system, comprising a phosphinimine catalyst and an activator, is used in a solution phase dual reactor system to prepare a polyethylene homopolymer composition by polymerization of ethylene.

In an embodiment of the disclosure, a solution phase dual reactor system comprises two solution phase reactors connected in series.

In an embodiment of the disclosure, a polymerization process to prepare the polyethylene homopolymer composition comprises contacting at least one single site polymerization catalyst system (comprising at least one single site catalyst and at least one activator) with ethylene under solution polymerization conditions in at least two polymerization reactors.

In an embodiment of the disclosure, a polymerization process to prepare the polyethylene homopolymer composition comprises contacting at least one single site polymerization catalyst system with ethylene under solution polymerization conditions in a first reactor and a second reactor configured in series.

The production of the polyethylene homopolymer composition of the present disclosure will typically include an extrusion or compounding step. Such steps are well known in the art.

The polyethylene homopolymer composition can comprise further polymer components in addition to the first and second ethylene homopolymers. Such polymer components include polymers made in situ or polymers added to the polymer composition during an extrusion or compounding step.

Optionally, additives can be added to the polyethylene homopolymer composition. Additives can be added to the polyethylene homopolymer composition during an extrusion or compounding step, but other suitable known methods will be apparent to a person skilled in the art. The additives can be added as is or as part of a separate polymer component (i.e. not the first or second ethylene homopolymers described herein) or added as part of a masterbatch (optionally during an extrusion or compounding step). Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucamide or behenamide, and nucleating agents (including nucleators, pigments or any other chemicals which may provide a nucleating effect to the polyethylene homopolymer composition). The additives that can be optionally added are typically added in amount of up to 20 weight percent (wt %).

One or more nucleating agent(s) may be introduced into the polyethylene homopolymer composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 µm). Compounds known to have a nucleating capacity for polyolefins include salts of aliphatic monobasic or dibasic acids or arylalkyl acids, such as sodium succinate, or aluminum phenylacetate; and alkali metal or aluminum salts of aromatic or alicyclic carboxylic acids such as sodium β-naphthoate, or sodium benzoate.

Some non-limiting examples of nucleating agents which are commercially available and which may be added to the polyethylene homopolymer composition are dibenzylidene sorbital esters (such as the products sold under the trademark MILLAD® 3988 by Milliken Chemical and IRGACLEAR® by Ciba Specialty Chemicals). Further non-limiting examples of nucleating agents which may be added to the polyethylene homopolymer composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further non-limiting examples of nucleating agents which may be added to the polyethylene homopolymer composition include those disclosed in WO2015042561, WO2015042563, WO2015042562 and WO2011050042.

Many of the above described nucleating agents may be difficult to mix with the polyethylene homopolymer composition that is being nucleated and it is known to use dispersion aids, such as for example, zinc stearate, to mitigate this problem.

In an embodiment of the disclosure, the nucleating agents are well dispersed in the polyethylene homopolymer composition.

In an embodiment of the disclosure, the amount of nucleating agent used is comparatively small—from 100 to 4000 parts by million per weight (based on the weight of the polyethylene homopolymer composition) so it will be appreciated by those skilled in the art that some care must be taken to ensure that the nucleating agent is well dispersed. In an embodiment of the disclosure, the nucleating agent is added in finely divided form (less than 50 microns, especially less than 10 microns) to the polyethylene homopolymer composition to facilitate mixing. This type of "physical blend" (i.e. a mixture of the nucleating agent and the resin in solid form) is in some embodiments preferable to the use of a "masterbatch" of the nucleator (where the term "masterbatch" refers to the practice of first melt mixing the additive—the nucleator, in this case—with a small amount of the polyethylene homopolymer composition—then melt mixing the "masterbatch" with the remaining bulk of the polyethylene homopolymer composition).

In an embodiment of the disclosure, an additive such as nucleating agent may be added to the polyethylene homopolymer composition by way of a "masterbatch", where the term "masterbatch" refers to the practice of first melt mixing the additive (e.g. a nucleator) with a small amount of the polyethylene homopolymer composition, followed by melt mixing the "masterbatch" with the remaining bulk of the polyethylene homopolymer composition.

In an embodiment of the disclosure, the polyethylene homopolymer composition further comprises a nucleating agent.

In an embodiment of the disclosure, the polyethylene homopolymer composition comprises from 20 to 4,000 ppm (i.e. parts per million, based on the total weight of the first and the second ethylene homopolymers in the polyethylene copolymer composition) of a nucleating agent.

In an embodiment of the disclosure, the polyethylene homopolymer composition further comprises a nucleating agent which is a salt of a dicarboxylic acid compound. A dicarboxylic acid compound is herein defined as an organic compound containing two carboxyl (—COOH) functional groups. A salt of a dicarboxylic acid compound then will comprise one or more suitable cationic counter cations, preferably metal cations, and an organic compound having two anionic carboxylate (—COO$^-$) groups.

In an embodiment of the disclosure, the polyethylene homopolymer composition is used in the formation of molded articles. Such articles may be formed by compression molding, continuous compression molding, injection molding or blow molding. Such articles include, for example, caps, screw caps, and closures, including hinged and tethered versions thereof, for bottles, containers, pouches, pill bottles, fitments, pharmaceutical bottles and the like.

In an embodiment of the disclosure, the polyethylene homopolymer composition is used in the formation of a fitment for bottles, pouches or the like.

In an embodiment of the disclosure, the polyethylene homopolymer composition is used in flexible packaging.

In an embodiment of the disclosure the polyethylene homopolymer composition is used in the formation of films, such as for example, blown film, cast film and lamination or extrusion film or extrusion coating as well as stretch film. Processes to make such films from a polymer are well known to persons skilled in the art.

In an embodiment of the disclosure, the polyethylene homopolymer composition is used in an extrusion coating film layer.

In an embodiment of the disclosure the polyethylene homopolymer composition is used in the formation of one or more than one film layer which is part of a multilayer layer film or film structure. Processes to makes such multilayer films or film structures are well known to persons skilled in the art.

In an embodiment of the disclosure, the polyethylene homopolymer composition is used in the formation of any closure, of any suitable design and dimensions for use in any hot filling process (or aseptic filling process) for filling any suitable bottle, container or the like.

In an embodiment of the disclosure, the polyethylene homopolymer composition is used in the formation of a closure for bottles, containers, pouches and the like. For example, closures for bottles formed by continuous compression molding, or injection molding are contemplated. Such closures include, for example, caps, hinged caps, screw caps, hinged screw caps, snap-top caps, hinged snap-top caps, and optionally hinged closures for bottles, containers, pouches and the like.

In an embodiment of the disclosure, the polyethylene homopolymer composition is used in the formation of a fitment for a pouch, container or the like.

In an embodiment of the disclosure, the polyethylene homopolymer composition is used in the formation of molded articles. For example, articles formed by continuous compression molding and injection molding are contemplated. Such articles include, for example, caps, screw caps, and closures for bottles.

Closures

The terms "cap" and "closure" are used interchangeably in the current disclosure, and both connote any suitably shaped molded article for enclosing, sealing, closing or covering etc., a suitably shaped opening, a suitably molded aperture, an open necked structure or the like used in combination with a container, a bottle, a jar, a pouch and the like.

Closures include one piece closures or closures comprising more than one piece.

In an embodiment of the disclosure, the polyethylene homopolymer compositions described above are used in the formation of a closure.

In an embodiment of the disclosure, the polyethylene homopolymer compositions described above are used in the formation of a one piece closure.

In an embodiment of the disclosure, the polyethylene homopolymer compositions described above are used in the formation of a closure having a tamper evident band (a TEB).

In an embodiment of the disclosure, the polyethylene homopolymer composition described above are used in the formation of a closure for bottles, containers, pouches and the like. For example, closures for bottles formed by compression molding or injection molding are contemplated. Such closures include, for example, hinged caps, hinged screw caps, hinged snap-top caps, and hinged closures for bottles, containers, pouches and the like.

In an embodiment of the disclosure, the polyethylene homopolymer compositions described above are used in the formation of a bottle closure assembly comprising a cap portion, a tether portion and a retaining means portion.

In an embodiment of the disclosure, a closure (or cap) is a screw cap for a bottle, container, pouch and the like.

In an embodiment of the disclosure, a closure (or cap) is a snap closure for a bottle, container, pouch and the like.

In an embodiment of the disclosure, a closure (or cap) comprises a hinge made of the same material as the rest of the closure (or cap).

In an embodiment of the disclosure, a closure (or cap) is hinged closure.

In an embodiment of the disclosure, a closure (or cap) is a hinged closure for bottles, containers, pouches and the like.

In an embodiment of the disclosure, a closure (or cap) is for retort, hot fill, aseptic fill and cold fill applications.

In an embodiment of the disclosure, a closure (or cap) is a flip-top hinge closure, such as a flip-top hinge closure for use on a plastic ketchup bottle or similar containers containing foodstuffs.

When a closure is a hinged closure, it comprises a hinged component and generally consists of at least two bodies which are connected by at least one thinner section that acts as a so called "living hinge" allowing the at least two bodies to bend from an initially molded position. The thinner section or sections may be continuous or web-like, wide or narrow.

A useful closure (for bottles, containers and the like) is a hinged closure and may consist of two bodies joined to each other by at least one thinner bendable portion (e.g. the two bodies can be joined by a single bridging portion, or more than one bridging portion, or by a webbed portion, etc.). A first body may contain a dispensing hole and which may snap onto or screw onto a container to cover a container opening (e.g. a bottle opening) while a second body may serve as a snap on lid which may mate with the first body.

The caps and closures, of which hinged caps and closures and screw caps are a subset, can be made according to any known method, including for example injection molding and compression molding techniques that are well known to persons skilled in the art. Hence, in an embodiment of the disclosure a closure (or cap) comprising the polyethylene homopolymer composition (defined above) is prepared with a process comprising at least one compression molding step and/or at least one injection molding step.

In one embodiment, the caps and closures (including single piece or multi-piece variants and hinged variants) comprise the polyethylene homopolymer composition described above which have good barrier properties, as well as good processability. Hence the closures and caps of this embodiment are well suited for sealing bottles, containers and the like, for examples bottles that may contain spoilable (for example, due to contact with oxygen) liquids or foodstuffs, including but not limited to liquids that are under an appropriate pressure (i.e. carbonated beverages or appropriately pressurized drinkable liquids).

The closures and caps may also be used for sealing bottles containing drinkable water or non-carbonated beverages (e.g. juice). Other applications, include caps and closures for bottles, containers and pouches containing foodstuffs, such as for example ketchup bottles and the like.

The closures and caps may be one-piece closures or two piece closures comprising a closure and a liner.

The closures and caps may also be of multilayer design, wherein the closure or cap comprises at least two layers at least one of which is made of the polyethylene blends described herein.

In an embodiment of the disclosure the closure is made by continuous compression molding.

In an embodiment of the disclosure the closure is made by injection molding.

A closure as described in the present disclosure may be a closure suitable for use in a container sealing process comprising one of more steps in which the closure comes into contact with a liquid at elevated temperatures, such as a hot fill processes, and in some cases an aseptic fill processes. Such closures and processes are described in for example CA Pat. Appl. Nos 2,914,353; 2,914,354; and 2,914,315.

In an embodiment of the disclosure, a closure made is a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In an embodiment of the disclosure, a closure is made using an injection molding process to prepare a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In an embodiment of the disclosure, a closure is made using a continuous compression molding process to prepare a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In embodiments of the disclosure, a closure is made using a molding process to prepare a PCO 1881 CSD closure having a having an oxygen transmission rate, OTR of ≤0.0030 $cm^3$/closure/day, or ≤0.0025 $cm^3$/closure/day, or ≤0.0021 $cm^3$/closure/day, or ≤0.0020 $cm^3$/closure/day, ≤0.0018 $cm^3$/closure/day, or ≤0.0016 $cm^3$/closure/day, or ≤0.0014 $cm^3$/closure/day.

In an embodiment of the disclosure, a closure is made using a continuous compression molding process to prepare a PCO 1881 CSD closure having an oxygen transmission rate, OTR of ≤0.0030 $cm^3$/closure/day, or ≤0.0025 $cm^3$/closure/day, or ≤0.0021 $cm^3$/closure/day, or ≤0.0020 $cm^3$/closure/day, ≤0.0018 $cm^3$/closure/day, or ≤0.0016 $cm^3$/closure/day, or ≤0.0014 $cm^3$/closure/day.

In an embodiment of the disclosure, the closure is made using an injection molding process to prepare a PCO 1881 CSD closure having a having an oxygen transmission rate, OTR of ≤0.0030 $cm^3$/closure/day, or ≤0.0025 $cm^3$/closure/day, or ≤0.0021 $cm^3$/closure/day, or ≤0.0020 $cm^3$/closure/day, ≤0.0018 $cm^3$/closure/day, or ≤0.0016 $cm^3$/closure/day, or ≤0.0014 $cm^3$/closure/day.

In embodiments of the disclosure, a closure is made using a molding process to prepare a PCO 1881 CSD closure having an oxygen transmission rate, OTR of from 0.0005 to 0.0025 $cm^3$/closure/day including any narrower ranges within this range and any values encompassed by these ranges. For example, in embodiments of the disclosure, a closure is made using a molding process to prepare a PCO 1881 CSD closure having an oxygen transmission rate, OTR of from 0.0006 to 0.0023 $cm^3$/closure/day, or from 0.0006 to 0.0021 $cm^3$/closure/day, or from 0.0006 to 0.0019 $cm^3$/closure/day, or from 0.0006 to 0.0017 $cm^3$/closure/day, or from 0.0006 to 0.0015 $cm^3$/closure/day, or from 0.0006 to 0.0013 $cm^3$/closure/day.

In an embodiment of the disclosure, a closure is made using a continuous compression molding process to prepare a PCO 1881 CSD closure having an oxygen transmission rate, OTR of from 0.0005 to 0.0025 $cm^3$/closure/day including any narrower ranges within this range and any values encompassed by these ranges. For example, in embodiments of the disclosure, a closure is made using a continuous compression molding process to prepare a PCO 1881 CSD closure having an oxygen transmission rate, OTR of from 0.0006 to 0.0023 $cm^3$/closure/day, or from 0.0006 to 0.0021 $cm^3$/closure/day, or from 0.0006 to 0.0019 $cm^3$/closure/day, or from 0.0006 to 0.0017 $cm^3$/closure/day, or from 0.0006 to 0.0015 $cm^3$/closure/day, or from 0.0006 to 0.0013 $cm^3$/closure/day.

In an embodiment of the disclosure, a closure is made using an injection molding process to prepare a PCO 1881 CSD closure having a having an oxygen transmission rate, OTR of from 0.0005 to 0.0025 $cm^3$/closure/day including any narrower ranges within this range and any values encompassed by these ranges. For example, in embodiments of the disclosure, a closure is made using an injection molding process to prepare a PCO 1881 CSD closure having a having an oxygen transmission rate, OTR of from 0.0006 to 0.0023 $cm^3$/closure/day, or from 0.0006 to 0.0021 $cm^3$/closure/day, or from 0.0006 to 0.0019 $cm^3$/closure/day, or from 0.0006 to 0.0017 $cm^3$/closure/day, or from 0.0006 to 0.0015 $cm^3$/closure/day, or from 0.0006 to 0.0013 $cm^3$/closure/day.

Cast (and Lamination) Film

In an embodiment of the disclosure, the polyethylene homopolymer compositions described above are used in the formation of a cast film or laminate film.

Cast films are extruded from a flat die onto a chilled roll or a nipped roll, optionally, with a vacuum box and/or air-knife. The films may be monolayer or coextruded multilayer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally, it passes through a system of rollers and is wound onto a roll. In another embodiment, two or more thin films are coextruded through two or more slits onto a chilled, highly polished turning roll, the coextruded film is quenched from one side. The speed of the roller controls the draw ratio and final coextruded film thickness. The coextruded film is then sent to a second roller for cooling on the other side. Finally, it passes through a system of rollers and is wound onto a roll.

In an embodiment, the cast film product may further be laminated one or more layers into a multilayer structure.

The cast films and laminates may be used in a variety of purposes, for example food packaging (dry foods, fresh foods, frozen foods, liquids, processed foods, powders, granules), for packaging of detergents, toothpaste, towels, for labels and release liners. The films may also be used in unitization and industrial packaging, notably in stretch films. The films may also be used in hygiene and medical applications, for example in breathable and non-breathable films used in diapers, adult incontinence products, feminine hygiene products, ostomy bags. Finally, cast films may also be used in tapes and artificial turf applications.

In embodiments of the disclosure, a film or film layer has a normalized oxygen transmission rate, OTR of $\leq 100$ cm$^3$/100 in$^2$/day, or $\leq 90$ cm$^3$/100 in$^2$/day, or $\leq 80$ cm$^3$/100 in$^2$/day, or $\leq 70$ cm$^3$/100 in$^2$/day.

In embodiments of the disclosure, a compression molded film or film layer has a normalized oxygen transmission rate, OTR of $\leq 100$ cm$^3$/100 in$^2$/day, or $\leq 90$ cm$^3$/100 in$^2$/day, or $\leq 80$ cm$^3$/100 in$^2$/day, or $\leq 70$ cm$^3$/100 in$^2$/day.

In embodiments of the disclosure, a cast film or film layer has a normalized oxygen transmission rate, OTR of $\leq 100$ cm$^3$/100 in$^2$/day, or $\leq 90$ cm$^3$/100 in$^2$/day, or $\leq 80$ cm$^3$/100 in$^2$/day, or $\leq 70$ cm$^3$/100 in$^2$/day.

In embodiments of the disclosure, a lamination film or film layer has a normalized oxygen transmission rate, OTR of $\leq 100$ cm$^3$/100 in$^2$/day, or $\leq 90$ cm$^3$/100 in$^2$/day, or $\leq 80$ cm$^3$/100 in$^2$/day, or $\leq 70$ cm$^3$/100 in$^2$/day.

In embodiments of the disclosure, a film or film layer has a normalized oxygen transmission rate, OTR of from 30 to 100 cm$^3$/100 in$^2$/day, including any narrower ranges within this range and any values encompassed by these ranges. For example, in embodiments of the disclosure, a film or film layer has a normalized oxygen transmission rate, OTR of from 30 to 90 cm$^3$/100 in$^2$/day, or from 40 to 90 cm$^3$/100 in$^2$/day, or from 30 to 80 cm$^3$/100 in$^2$/day, or from 40 to 80 cm$^3$/100 in$^2$/day, or from 30 to 70 cm$^3$/100 in$^2$/day, or from 40 to 70 cm$^3$/100 in$^2$/day.

In embodiments of the disclosure, a compression molded film or film layer has a normalized oxygen transmission rate, OTR of from 30 to 100 cm$^3$/100 in$^2$/day, including any narrower ranges within this range and any values encompassed by these ranges. For example, in embodiments of the disclosure, a compression molded film or film layer has a normalized oxygen transmission rate, OTR of from 30 to 90 cm$^3$/100 in$^2$/day, or from 40 to 90 cm$^3$/100 in$^2$/day, or from 30 to 80 cm$^3$/100 in$^2$/day, or from 40 to 80 cm$^3$/100 in$^2$/day, or from 30 to 70 cm$^3$/100 in$^2$/day, or from 40 to 70 cm$^3$/100 in$^2$/day.

In embodiments of the disclosure, a cast film or film layer has a normalized oxygen transmission rate, OTR of from 30 to 100 cm$^3$/100 in$^2$/day, including any narrower ranges within this range and any values encompassed by these ranges. For example, in embodiments of the disclosure, a cast film or film layer has a normalized oxygen transmission rate, OTR of from 30 to 90 cm$^3$/100 in$^2$/day, or from 40 to 90 cm$^3$/100 in$^2$/day, or from 30 to 80 cm$^3$/100 in$^2$/day, or from 40 to 80 cm$^3$/100 in$^2$/day, or from 30 to 70 cm$^3$/100 in$^2$/day, or from 40 to 70 cm$^3$/100 in$^2$/day.

In embodiments of the disclosure, a lamination film or film layer has a normalized oxygen transmission rate, OTR of from 30 to 100 cm$^3$/100 in$^2$/day, including any narrower ranges within this range and any values encompassed by these ranges. For example, in embodiments of the disclosure, a lamination film or film layer has a normalized oxygen transmission rate, OTR of from 30 to 90 cm$^3$/100 in$^2$/day, or from 40 to 90 cm$^3$/100 in$^2$/day, or from 30 to 80 cm$^3$/100 in$^2$/day, or from 40 to 80 cm$^3$/100 in$^2$/day, or from 30 to 70 cm$^3$/100 in$^2$/day, or from 40 to 70 cm$^3$/100 in$^2$/day.

In embodiments of the disclosure, a film or film layer has a normalized water vapor transmission rate, WVTR of $\leq 0.250$ g/100 in$^2$/day, or $\leq 0.230$ g/100 in$^2$/day, or $\leq 0.210$ g/100 in$^2$/day, or $\leq 0.200$ g/100 in$^2$/day, or $\leq 0.190$ g/100 in$^2$/day, or $\leq 0.180$ g/100 in$^2$/day.

In embodiments of the disclosure, a compression molded film or film layer has a normalized water vapor transmission rate, WVTR of $\leq 0.250$ g/100 in$^2$/day, or $\leq 0.230$ g/100 in$^2$/day, or $\leq 0.210$ g/100 in$^2$/day, or $\leq 0.200$ g/100 in$^2$/day, or $\leq 0.190$ g/100 in$^2$/day, or $\leq 0.180$ g/100 in$^2$/day.

In embodiments of the disclosure, a cast film or film layer has a normalized water vapor transmission rate, WVTR of $\leq 0.250$ g/100 in$^2$/day, or $\leq 0.230$ g/100 in$^2$/day, or $\leq 0.210$ g/100 in$^2$/day, or $\leq 0.200$ g/100 in$^2$/day, or $\leq 0.190$ g/100 in$^2$/day, or $\leq 0.180$ g/100 in$^2$/day.

In embodiments of the disclosure, a lamination film or film layer has a normalized water vapor transmission rate, WVTR of $\leq 0.250$ g/100 in$^2$/day, or $\leq 0.230$ g/100 in$^2$/day, or $\leq 0.210$ g/100 in$^2$/day, or $\leq 0.200$ g/100 in$^2$/day, or $\leq 0.190$ g/100 in$^2$/day, or $\leq 0.180$ g/100 in$^2$/day.

In embodiments of the disclosure, a film or film layer has a normalized water vapor transmission rate, WVTR of from 0.080 to 0.250 g/100 in$^2$/day including any narrower ranges within this range and any values encompassed by these ranges. For example, in embodiments of the disclosure, a film or film layer has a normalized water vapor transmission rate, WVTR of from 0.100 to 0.230 g/100 in$^2$/day, or from 0.100 to 0.210 g/100 in$^2$/day, or from 0.100 to 0.200 g/100 in$^2$/day, or from 0.100 to 0.190 g/100 in$^2$/day, or from 0.100 to 0.180 g/100 in$^2$/day, or from 0.100 to 0.175 g/100 in$^2$/day, or from 0.110 to 0.230 g/100 in$^2$/day, or from 0.110 to 0.210 g/100 in$^2$/day, or from 0.110 to 0.200 g/100 in$^2$/day, or from 0.110 to 0.190 g/100 in$^2$/day, or from 0.110 to 0.180 g/100 in$^2$/day, or from 0.110 to 0.175 g/100 in$^2$/day.

In embodiments of the disclosure, a compression molded film or film layer has a normalized water vapor transmission rate, WVTR of from 0.080 to 0.250 g/100 in$^2$/day including any narrower ranges within this range and any values encompassed by these ranges. For example, in embodiments of the disclosure, a compression molded film or film layer has a normalized water vapor transmission rate, WVTR of from 0.100 to 0.230 g/100 in$^2$/day, or from 0.100 to 0.210 g/100 in$^2$/day, or from 0.100 to 0.200 g/100 in$^2$/day, or from 0.100 to 0.190 g/100 in$^2$/day, or from 0.100 to 0.180 g/100 in$^2$/day, or from 0.100 to 0.175 g/100 in$^2$/day, or from 0.110 to 0.230 g/100 in$^2$/day, or from 0.110 to 0.210 g/100 in$^2$/day, or from 0.110 to 0.200 g/100 in$^2$/day, or from 0.110 to 0.190 g/100 in$^2$/day, or from 0.110 to 0.180 g/100 in$^2$/day, or from 0.110 to 0.175 g/100 in$^2$/day.

In embodiments of the disclosure, a cast film or film layer has a normalized water vapor transmission rate, WVTR of from 0.080 to 0.250 g/100 in$^2$/day including any narrower ranges within this range and any values encompassed by these ranges. For example, in embodiments of the disclosure, a cast film or film layer has a normalized water vapor transmission rate, WVTR of from 0.100 to 0.230 g/100 in$^2$/day, or from 0.100 to 0.210 g/100 in$^2$/day, or from 0.100 to 0.200 g/100 in$^2$/day, or from 0.100 to 0.190 g/100 in$^2$/day, or from 0.100 to 0.180 g/100 in$^2$/day, or from 0.100 to 0.175 g/100 in$^2$/day, or from 0.110 to 0.230 g/100 in$^2$/day, or from 0.110 to 0.210 g/100 in$^2$/day, or from 0.110 to 0.200 g/100 in$^2$/day, or from 0.110 to 0.190 g/100 in$^2$/day, or from 0.110 to 0.180 g/100 in$^2$/day, or from 0.110 to 0.175 g/100 in$^2$/day.

In embodiments of the disclosure, a lamination film or film layer has a normalized water vapor transmission rate, WVTR of from 0.080 to 0.250 g/100 in$^2$/day including any narrower ranges within this range and any values encompassed by these ranges. For example, in embodiments of the disclosure, a lamination film or film layer has a normalized water vapor transmission rate, WVTR of from 0.100 to 0.230 g/100 in$^2$/day, or from 0.100 to 0.210 g/100 in$^2$/day, or from 0.100 to 0.200 g/100 in$^2$/day, or from 0.100 to 0.190 g/100 in$^2$/day, or from 0.100 to 0.180 g/100 in$^2$/day, or from 0.100 to 0.175 g/100 in$^2$/day, or from 0.110 to 0.230 g/100 in$^2$/day, or from 0.110 to 0.210 g/100 in$^2$/day, or from 0.110 to 0.200 g/100 in$^2$/day, or from 0.110 to 0.190 g/100 in$^2$/day, or from 0.110 to 0.180 g/100 in$^2$/day, or from 0.110 to 0.175 g/100 in$^2$/day.

Further non-limiting details of the disclosure are provided in the following examples. The examples are presented for the purposes of illustrating selected embodiments of this disclosure, it being understood that the examples presented do not limit the claims presented.

EXAMPLES

General Polymer Characterization Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Polyethylene homopolymer composition density (in g/cm$^3$) was determined using ASTM D792-13 (Nov. 1, 2013).

Melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log ($I_6/I_2$)/log (6480/2160); wherein $I_6$ and $I_2$ are the melt flow rates measured at 190° C. using 6.48 kg and 2.16 kg loads, respectively.

$M_n$, $M_w$, and $M_z$ (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the 2$^{nd}$ heating cycle.

Unsaturations in the polyethylene homopolymer composition were determined by Fourier Transform Infrared Spectroscopy (FTIR) as per ASTM D3124-98.

Hexane extractables were determined according to ASTM D5227.

Shear viscosity was measured by using a Kayeness WinKARS Capillary Rheometer (model #D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

The Shear Viscosity Ratio as the term is used in the present disclosure is defined as: $\eta_{100}/\eta_{100000}$ at 240° C. The processability indicator is defined as $100/\eta_{1000000}$. The $\eta_{100}$ is the melt shear viscosity at the shear rate of 100 s$^{-1}$ and the $\eta_{100000}$ is the melt shear viscosity at the shear rate of 100000 s$^{-1}$ measured at 240° C.

The "processability indicator" as used herein is defined as: processability Indicator=$100/\eta(10^5$ s$^{-1}$, 240° C.); where $\eta$ is the shear viscosity measured at $10^5$ 1/s at 240° C.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G''), complex modulus (G*) and complex viscosity ($\eta$*) were obtained as a function of frequency. The same rheological data can also be obtained by using a 25 mm diameter parallel plate geometry at 190° under nitrogen atmosphere. The Zero shear viscosity is estimated using the Ellis model, i.e. $\eta(\omega)=\eta_0/(1+\tau/\tau_{1/2})^{\alpha-1}$, where $\eta_0$ is the zero shear viscosity. $\tau_{1/2}$ is the value of the shear stress at which $\eta=\eta_0/2$ and $\alpha$ is one of the adjustable parameters. The Cox-Merz rule is assumed to be applicable in the present disclosure. The SHI(1,100) value is calculated according to the methods described in WO 2006/048253 and WO 2006/048254.

The DRI, is the "dow rheology index", and is defined by the equation: DRI=[365000($\tau_0/\eta_0$)−1]/10; wherein $\tau_0$ is the characteristic relaxation time of the polyethylene and $\eta_0$ is the zero shear viscosity of the material. The DRI is calculated by least squares fit of the rheological curve (dynamic complex viscosity versus applied frequency e.g. 0.01-100 rads/s) as described in U.S. Pat. No. 6,114,486 with the following generalized Cross equation, i.e. $\eta(\omega)=\eta_0/[1+(\omega\tau_0)^n]$; wherein n is the power law index of the material, $n(\omega)$ and $\omega$ are the measured complex viscosity and applied frequency data respectively. When determining the DRI, the zero shear viscosity, no used was estimated with the Ellis model, rather than the Cross model.

The crossover frequency is the frequency at which storage modulus (G') and loss modulus (G") curves cross with each other, while G'@G"=500 Pa is the storage modulus at which the loss modulus (G") is at 500 Pa.

Plaques molded from the polyethylene homopolymer compositions were tested according to the following ASTM methods: Bent Strip Environmental Stress Crack Resistance (ESCR) at Condition B at 100% IGEPAL at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Examples of the polyethylene homopolymer compositions were produced in a dual reactor solution polymerization process in which the contents of the first reactor flow into the second reactor. This in-series "dual reactor" process produces an "in-situ" polyethylene blend (i.e., the polyethylene homopolymer composition). Note, that when an in-series reactor configuration is used, un-reacted ethylene monomer present in the first reactor, will flow into the downstream second reactor for further polymerization.

In the present inventive examples, no co-monomer is fed to the first or second reactors, and an ethylene homopolymer is formed in each reactor. Each reactor is sufficiently agitated to give conditions in which components are well mixed. The volume of the first reactor was 12 liters and the volume of the second reactor was 22 liters. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a phosphinimine catalyst, which was a titanium complex having a phosphinimine ligand ((tert-butyl)$_3$P=N), a cyclopentadienide ligand (Cp) and two activatable ligands (chloride ligands; note: "activatable ligands" are removed, by for example electrophilic abstraction using a co-catalyst or activator to generate an active metal center). A boron based co-catalyst ($Ph_3CB(C_6F_5)_4$) was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1. The polymerization conditions used to make the inventive polyethylene homopolymer compositions are provided in Table 1.

The polyethylene homopolymer compositions of Examples 1 and 2 which are inventive are made using a single site phosphinimine catalyst in a dual reactor solution process as described above. Each has a weight average molecular weight, $M_w$ of below about 65,000 g/mol and a melt index, $I_2$ of greater than 10 g/10 min.

Comparative polyethylene homopolymer compositions (Examples 3 and 4), which were nucleated with HPN20E (which can be obtained commercially from Milliken Chemical) in the same manner and to the same amounts Examples 1 and 2 (see below), were prepared in a dual reactor solution polymerization process using a phosphinimine catalyst, in a manner substantially as outlined in U.S. Pat. Pub. Nos. 2008/0118749 and 2015/0203671 both of which are incorporated herein in their entirety.

The comparative polyethylene homopolymer compositions of Example 3 and 4 each has a melt index, $I_2$ of less 10 g/10 min and a weight average molecular weight, Mw of greater than about 65,000 g/mol.

As can be seen in FIG. 1, the inventive Examples 1 and 2 have a bimodal molecular weight distribution or profile in a GPC analysis, as do the comparative Examples 3 and 4.

Non-nucleated and nucleated Inventive and as well Comparative polyethylene homopolymer composition properties are provided in Table 2. The nucleated Inventive resins which are denoted in the Tables with the symbol "*", were prepared in the following manner. A 4% (by weight) masterbatch of HYPERFORM® HPN-20E nucleating agent from Milliken Chemical was first prepared. This masterbatch also contained 1% (by weight) of DHT-4V (aluminium magnesium carbonate hydroxide) from Kisuma Chemicals. The base resin and the nucleating agent masterbatch were then melt blended using a Coperion ZSK 26 co-rotating twin screw extruder with an L/D of 32:1 to give a polyethylene homopolymer composition having 1200 parts per million (ppm) of the HYPERFORM HPN-20E nucleating agent present (based on the weight of the polyethylene homopolymer composition). The extruder was fitted with an underwater pelletizer and a Gala spin dryer. The materials were co-fed to the extruder using gravimetric feeders to achieve the desired nucleating agent level. The blends were compounded using a screw speed of 200 rpm at an output rate of 15-20 kg/hour and at a melt temperature of 225-230° C.

The calculated properties for the first ethylene homopolymer and the second ethylene homopolymer present in each of the inventive and comparative homopolymer compositions are provided in Table 3 (see "Polymerization Reactor Modeling" below for methods of calculating these properties).

The properties of pressed plaques made from non-nucleated and nucleated inventive polyethylene homopolymer compositions as well as comparative compositions are provided in Table 4.

Polymerization Reactor Modeling

For multicomponent (or bimodal resins) polyethylene polymers with very low comonomer content, it can be difficult to reliably estimate the short chain branching (and subsequently polyethylene resin density by combining other information) of each polymer component by mathematical deconvolution of GPC-FTIR data, as was done in for example U.S. Pat. No. 8,022,143. Instead, the Mw, Mn, MZ, Mw/Mn of the first and second ethylene homopolymers were calculated herein using the Polymerization Reactor Modeling that was described in detail in U.S. Pat. No. 9,074,082, but with the exception that the short chain branching per thousand carbons (SCB/1000C) of each of the first and second polymer components, the first and second ethylene homopolymers was set to zero due to absence of comonomer in the feed. The Polymerization reactor model or simulation used the input conditions which were employed for actual pilot scale run conditions (for references on relevant reactor modeling methods, see "Copolymerization" by A. Hamielec, J. MacGregor, and A. Penlidis in *Comprehensive Polymer Science and Supplements*, volume 3, Chapter 2, page 17, Elsevier, 1996 and "Copolymerization of Olefins in a Series of Continuous Stirred-Tank Slurry-Reactors using Heterogeneous Ziegler-Natta and Metallocene Catalysts. I. General Dynamic Mathematical Model" by J. B. P Soares and A. E Hamielec in *Polymer Reaction Engineering*, 4(2&3), p153, 1996.)

The model takes for input the flow of several reactive species (e.g. catalyst, monomer such as ethylene, hydrogen, and solvent) going to each reactor, the temperature (in each reactor), and the conversion of ethylene (in each reactor), and calculates the polymer properties (of the polymer made in each reactor, i.e. the first and second ethylene homopolymers) using a terminal kinetic model for continuously stirred tank reactors (CSTRs) connected in series. The "terminal kinetic model" assumes that the kinetics depend upon the monomer (e.g. ethylene) unit within the polymer chain on which the active catalyst site is located (see "Copolymerization" by A. Hamielec, J. MacGregor, and A. Penlidis in *Comprehensive Polymer Science and Supplements*, volume 3, Chapter 2, page 17, Elsevier, 1996). In the model, the homopolymer chains are assumed to be of reasonably large molecular weight to ensure that the statistics of monomer unit insertion at the active catalyst center is valid and that monomers consumed in routes other than propagation are negligible. This is known as the "long chain" approximation.

The terminal kinetic model for polymerization includes reaction rate equations for activation, initiation, propagation, chain transfer, and deactivation pathways. This model solves the steady-state conservation equations (e.g. the total mass balance and heat balance) for the reactive fluid which comprises the reactive species identified above.

The total mass balance for a generic CSTR with a given number of inlets and outlets is given by:

$$0 = \Sigma_i \dot{m}_i \quad (1)$$

where $\dot{m}_i$ represents the mass flow rate of individual streams with index i indicating the inlet and outlet streams.

Equation (1) can be further expanded to show the individual species and reactions:

$$0 = \frac{\sum_i^{m\dot{x}_{ij}}/M_i}{\rho_{mix} V} + R_j/\rho_{mix} \quad (2)$$

where $M_i$ is the average molar weight of the fluid inlet or outlet (i), $x_{ij}$ is the mass fraction of species j in stream i, $\mu_{mix}$ is the molar density of the reactor mixture, V is the reactor volume, $R_j$ is the reaction rate for species j, which has units of kmol/m 3 s.

The total heat balance is solved for an adiabatic reactor and is given by:

$$0 = (\Sigma \dot{m}_i \Delta H_i + q_{Rx} V + \dot{W} - \dot{Q}) \quad (3)$$

where, $\dot{m}_i$ is the mass flow rate of stream i (inlet or oulet), $\Delta H_i$ is the difference in enthalpy of stream i versus a reference state, $g_{Rx}$ is the heat released by reaction(s), V is the reactor volume, $\dot{W}$ is the work input (i.e. agitator), $\dot{Q}$ is the heat input/loss.

The catalyst concentration input to each reactor is adjusted to match the experimentally determined ethylene conversion and reactor temperature values in order solve the equations of the kinetic model (e.g. propagation rates, heat balance and mass balance).

The $H_2$ concentration input to each reactor may be likewise adjusted so that the calculated molecular weight distribution of a polymer made over both reactors (and hence the molecular weight of polymer made in each reactor) matches that which is observed experimentally.

The degree of polymerization (DPN) for a homopolymerization reaction is given by the ratio of the rate of chain propagation reactions over the rate of chain transfer/termination reactions:

$$DPN = \frac{k_{p11}[m_1]}{k_{tm11}[m_1] + k_{ts1} + k_{tH1}[H]} \quad (4)$$

where $k_{p11}$ is the propagation rate constant for monomer 1, $[m_1]$ is the molar concentration of monomer 1 (ethylene) in the reactor, $k_{tm11}$ the termination rate constant for chain transfer to monomer, $k_{ts1}$ is rate constant for the spontaneous chain termination for a chain ending with monomer 1, $k_{tH1}$ is the rate constant for the chain termination by hydrogen for a chain ending with monomer 1.

The number average molecular weight (Mn) for a polymer follows from the degree of polymerization and the molecular weight of a monomer unit. From the number average molecular weight of polymer in each reactor, and assuming a Flory distribution for a single site catalyst, the molecular weight distribution is determined for the polymer formed in each reactor:

$$w(n) = \tau^2 n e^{-\tau n} \quad (5)$$

where $$\tau = \frac{1}{DPN},$$

and w(n) is the weight fraction of polymer having a chain length n. The Flory distribution can be transformed into the common log scaled GPC trace by applying:

$$\frac{dW}{d\log(M)} = \ln(10) \frac{n^2}{DPN^2} e^{(-\frac{n}{DPN})} \quad (6)$$

where $$\frac{dW}{d\log(MW)}$$

is the differential weight fraction of polymer with a chain length n (n=MW/28 where 28 is the molecular weight of the polymer segment corresponding to a $C_2H_4$ unit) and DPN is the degree of polymerization as calculated by Equation (4). From the Flory model, the $M_w$ and the $M_z$ of the polymer made in each reactor are: $M_w = 2 \times M_n$ and $M_z = 1.5 \times M_w$.

The overall molecular weight distribution over both reactors is simply the sum of the molecular weight distribution of polymer made in each reactor, and where each Flory distribution is multiplied by the weight fraction of polymer made in each reactor:

$$\frac{d\overline{W}}{d\log(MW)} = \quad (7)$$

$$w_{R1}\left(\ln(10)\frac{n^2}{DPN_{R1}^2}e^{\left(-\frac{n}{DPN_{R1}}\right)}\right) + w_{R2}\left(\ln(10)\frac{n^2}{DPN_{R2}^2}e^{\left(-\frac{n}{DPN_{R2}}\right)}\right)$$

where $\overline{dW}/d\log(mw)$ is me overall molecular weight distribution function, $w_{R1}$ and $w_{R2}$ are the weight fraction of polymer made in each reactor, $DPN_1$ and $DPN_2$ is the average chain length of the polymer made in each reactor (i.e. $DPN_1 = M_{nR1}/28$). The weight fraction of material made in each reactor is determined from knowing the mass flow of monomer into each reactor along with knowing the conversions for monomer in each reactor.

The moments of the overall molecular weight distribution (or the molecular weight distribution of polymer made in each reactor) can be calculated using equations 8a, 8b and 8c (a Flory Model is assumed above, but the below generic formula apply to other model distributions as well):

$$\overline{M_n} = \frac{\sum_i w_i}{\sum_i \frac{w_i}{M_i}} \quad (8a)$$

$$\overline{M_w} = \frac{\sum_i w_i M_i}{\sum_i w_i} \quad (8b)$$

$$\overline{M_z} = \frac{\sum_i w_i M_i^2}{\sum_i w_i M_i} \quad (8c)$$

For the polymer obtained in each reactor, the key resin parameters which are obtained from the above described kinetic model are the molecular weights Mn, Mw and Mz, the molecular weight distributions $M_w/M_n$ and Mz/Mw the branching frequency (in this case 0). With this information in hand, a component (or composition) density model and a component (or composition) melt index, $I_2$, model was used according to the following equations, which were empirically determined, to calculate the density and melt index $I_2$ of each of the first and second ethylene homopolymers:

$$\text{Density: } \frac{1}{\rho} = 1.0142 + 0.0033(1.22 \cdot BF)^{0.8346} + \frac{0.0303 k^{0.9804}}{1 + \frac{0.3712}{e^{1.22BF}}}$$

where, BF is the branching frequency (note that here, the BF=0, as is appropriate for a homopolymer), $k = \log_{10}(M_n/1000)$ Melt Index, $I_2(MI)$:

$$\log_{10}(MI) = 7.8998 - 3.9089 \log_{10}\left(\frac{M_w}{1000}\right) - 0.2799 \frac{M_n}{M_w}$$

Hence, the above models were used to estimate the branch frequency, weight fraction (or weight percent), melt index and the density of the polyethylene composition components, which were formed in each of reactor 1 and 2 (i.e. the first and second ethylene homopolymers).

TABLE 1

Reactor Conditions

|  | Example No. | |
|---|---|---|
|  | Inv. 1 | Inv. 2 |
| Reactor 1 | | |
| Ethylene (kg/h) | 36 | 36 |
| Octene (kg/h) | 0 | 0 |
| Hydrogen (g/h) | 1.1 | 1.4 |
| Solvent (kg/h) | 307 | 307 |
| Reactor feed inlet temperature (° C.) | 35 | 35 |
| Reactor Temperature (° C.) | 162.9 | 163 |
| Titanium Catalyst (ppm) | 0.0174 | 0.0140 |
| Reactor 2 | | |
| Ethylene (kg/h) | 36.1 | 36 |
| Octene (kg/h) | 0 | 0 |
| Hydrogen (g/h) | 27 | 28 |
| Solvent (kg/h) | 170.9 | 170.9 |
| Reactor feed inlet temperature (° C.) | 35 | 35 |
| Reactor Temperature (° C.) | 199.9 | 190.2 |
| Titanium Catalyst (ppm) | 0.0547 | 0.0583 |

TABLE 2

Resin Properties

| Example No. | Inv. 1 | Inv. 1* | Inv. 2 | Inv. 2* | Comp. 3 | Comp. 4 |
|---|---|---|---|---|---|---|
| Nucleating Agent | None | HPN20E | None | HPN20E | HPN20E | HPN20E |
| Density (g/cm³) | 0.9662 | 0.9684 | 0.9675 | 0.9698 | 0.966 | 0.968 |
| Base Resin Density (g/cm³) | | 0.9662 | | 0.9675 | | |
| density increase after nucleation | | 0.0022 | | 0.0023 | | |
| Melt Index $I_2$ (g/10 min), base resin | 12.2 | | 20.4 | | 1.2 | 6 |
| Melt Index $I_6$ (g/10 min) | 49.2 | | 81.6 | | 5.49 | 24.5 |
| Melt Index $I_{10}$ (g/10 min) | 86.9 | | 155 | | 11 | 45.5 |
| Melt Index $I_{21}$ (g/10 min) | 403 | | 661 | | 69 | 194 |
| Melt Flow Ratio ($I_{21}/I_2$) | 33.2 | | 32.5 | | 57 | 33 |
| Stress Exponent | 1.27 | | 1.26 | | 1.38 | 1.27 |
| Melt Flow Ratio ($I_{10}/I_2$) | 7.64 | | 7.62 | | 9.4 | 7.59 |
| Rheological Properties | | | | | | |
| Shear viscosity (η) at $10^5$ s$^{-1}$ (240° C., Pa-s) | 4.4 | | 4.0 | | 5.4 | 5.2 |
| 100/η at 105 s$^{-1}$ (240° C.), Processability Indicator | 22.7 | | 25 | | 18.5 | 19.2 |
| Shear viscosity Ratio $\eta_{100}/\eta_{100000}$ (240° C.) | 62 | | 42.6 | | 185 | 87 |

TABLE 2-continued

Resin Properties

| Example No. | Inv. 1 | Inv. 1* | Inv. 2 | Inv. 2* | Comp. 3 | Comp. 4 |
|---|---|---|---|---|---|---|
| Zero Shear Viscosity-190° C. (Pa-s) | 769.5 | | 413.54 | | | |
| DRI | 0.262 | | 0.24 | | | |
| G'@G" = 500 Pa | 21.1 | | 15 | | | |
| DSC | | | | | | |
| Primary Melting Peak (° C.) | 131.69 | 133.93 | 131.77 | 134.39 | 133.74 | 133.80 |
| Heat of Fusion (J/g) | 253 | 267.2 | 250.2 | 254.9 | 244.74 | 244.80 |
| Crystallinity (%) | 87.23 | 92.13 | 86.29 | 87.89 | 84.39 | 84.41 |
| GPC | | | | | | |
| $M_n$ | 6776 | | 7613 | | 12764 | 14377 |
| $M_w$ | 51377 | | 45924 | | 96923 | 69182 |
| $M_z$ | 128954 | | 112444 | | 280629 | 163561 |
| Polydispersity Index ($M_w/M_n$) | 7.58 | | 6.03 | | 7.59 | 4.81 |
| Hexane Extractables (%)-Plaque | 0.53 | | 0.57 | | 0.21 | 0.53 |

TABLE 3

Polyethylene Homopolymer Composition Component Properties

| | Example No. | | | |
|---|---|---|---|---|
| | Inv. 1 | Inv. 2 | Comp. 3 | Comp. 4 |
| Density (g/cm³) | 0.9662 | 0.9675 | 0.966 | 0.968 |
| $I_2$ (g/10 min) | 12.2 | 20.4 | 1.2 | 6 |
| Stress Exponent | 1.27 | 1.26 | 1.38 | 1.27 |
| MFR ($I_{21}/I_2$) | 33.2 | 32.5 | 57 | 33 |
| Mw/Mn | 7.58 | 6.03 | 7.59 | 4.81 |
| First Ethylene Homopolymer | | | | |
| Weight fraction | 0.536 | 0.535 | 0.47 | 0.515 |
| Mw | 108323 | 92663 | 177980 | 115059 |
| $I_2$ (g/10 min) | 0.64 | 1.18 | 0.09 | 0.51 |
| SCB1/1000C. | 0 | 0 | 0 | 0 |
| Density, d1 (g/cm³) | 0.9506 | 0.952 | 0.9464 | 0.95 |
| Second Ethylene Homopolymer | | | | |
| Weight fraction | 0.464 | 0.465 | 0.53 | 0.485 |
| Mw | 8685 | 8620 | 13394 | 13105 |
| $I_2$ (g/10 min.) | 12306 | 12674 | 2264.0 | 2465.0 |
| SCB2/1000C | 0 | 0 | 0 | 0 |
| Density, d2 (g/cm³) | 0.9724 | 0.9725 | 0.9685 | 0.9687 |
| Estimated (d2 − d1), g/cm³ | 0.0218 | 0.0205 | 0.0221 | 0.0187 |

TABLE 4

Plaque Properties

| Example No. | Inv. 1 | Inv. 1* | Inv. 2 | Inv. 2* | Comp. 3 | Comp. 4 |
|---|---|---|---|---|---|---|
| Tensile Properties (Plaques) | | | | | | |
| Elong. at Yield (%) | 7 | 6 | 4 | 4 | | 7 |
| Elong. at Yield Dev. (%) | 0.1 | 0.7 | 0.1 | 0.5 | | 0 |
| Yield Strength (MPa) | 33.5 | 34.8 | 32.9 | 34.6 | | 34.2 |
| Yield Strength Dev. (MPa) | 0.1 | 0.2 | 0.9 | 1 | | 0.4 |
| Ultimate Elong. (%) | 10 | 6 | 4 | 4 | | 7 |
| Ultimate Elong. Dev. (%) | 0.1 | 0.7 | 0.1 | 0.5 | | 0 |
| Ultimate Strength (MPa) | 32.3 | 34.8 | 32.9 | 34.6 | | 34.2 |
| Ultimate Strength Dev. (MPa) | 1 | 0.2 | 0.9 | 1 | | 0.4 |
| Sec Mod 1% (MPa) | 1751.1 | 1974 | 1870.1 | 1997 | 1792 | 1996 |
| Sec Mod 1% (MPa) Dev. | 69.6 | 31 | 34 | 61 | 165 | 109 |
| Sec Mod 2% (MPa) | 1280.8 | 1391 | 1338 | 1435 | 1233 | 1365 |
| Sec Mod 2% (MPa) Dev. | 17.9 | 15 | 11 | 34 | 33 | 29 |
| Youngs Modulus (MPa) | 2543 | | 2790.1 | | | |
| Youngs Modulus (MPa) Dev. | 477.1 | | 558.4 | | | |
| Flexural Properties (Plaques) | | | | | | |
| Flex Secant Mod. 1% (MPa) | 1853 | 1994 | 1882 | 2241 | 1856 | 1940 |
| Flex Sec Mod 1% (MPa) Dev. | 62 | 126 | 38 | 94 | 79 | 57 |
| Flex Secant Mod. 2% (MPa) | 1535 | 1652 | 1549 | 1817 | 1553 | 1580 |
| Flex Sec Mod 2% (MPa) Dev. | 42 | 87 | 15 | 64 | 29 | 40 |
| Flex Tangent Mod. (MPa) | 2136 | 2276 | 2190 | 2587 | 2167 | 2309 |
| Flex Tangent Mod. Dev. (MPa) | 94 | 175 | 111 | 147 | 191 | 147 |
| Flexural Strength (MPa) | 48.7 | 51.6 | 49.5 | 54.8 | 48.5 | 49.1 |
| Flexural Strength Dev. (MPa) | 0.6 | 1.6 | 0.6 | 1.5 | 0.4 | 1.3 |
| Impact Properties (Plaques) | | | | | | |
| Izod Impact (ft-lb/in) | 0.5 | | 0.4 | | 2 | 1.4 |
| Environmental Stress Crack Resistance | | | | | | |
| ESCR Cond. B at 100% CO-630 (hrs) | 0 | | 0 | | <16 | 4 |
| Miscellaneous | | | | | | |

TABLE 4-continued

Plaque Properties

| Example No. | Inv. 1 | Inv. 1* | Inv. 2 | Inv. 2* | Comp. 3 | Comp. 4 |
|---|---|---|---|---|---|---|
| VICAT Soft. Pt. (° C.)-Plaque | 125 | | 123.6 | | 128.4 | 127.4 |
| Heat Deflection Temp. (° C.) @66 PSI | 80.7 | | 85.4 | | 77.2 | 76.2 |

Method of Making Compression Molded Film

A laboratory scale compression molding press Wabash G304 from Wabash MPI was used to prepare compression molded film from the inventive and comparative polyethylene homopolymer compositions. A metal frame of required dimensions and thickness was filled with a measured quantity of resin (e.g. pellets of a polyethylene homopolymer composition) and sandwiched between two polished metal plates. The measured polymer quantity used was sufficient to obtain the desired film thickness. Polyester sheets (Mylar) were used on top of the metal backing plates to prevent the sticking of the resin to the metal plates. This assembly with the resin was loaded in the compression press and preheated at 200° C. under a low pressure (e.g. 2 tons or 4400 lbs per square foot) for five minutes. The platens were closed and a high pressure (e.g. 28 tons or 61670 lbs per square foot) was applied for another five minutes. After that, the press was cooled to about 45° C. at a rate of about 15° C. per minute. On completion of the cycle, the frame assembly was taken out, disassembled and the film (or plaque) was separated from the frame. Subsequent tests were done after at least 48 hours after the time at which the compression molding was carried out.

Determination of the Oxygen Transmission Rate (OTR) of a Compression Molded Film Using a Masking Method The oxygen transmission rate (OTR) of the compression-molded film was tested using an OX-TRAN® 2/20 instrument manufactured by MOCON Inc, Minneapolis, Minnesota, USA using a version of ASTM F1249-90. The instrument has two test cells (A and B) and each film sample was analyzed in duplicate. The OTR result reported is the average of the results from these two test cells (A and B). The test is carried out at a temperature of 23° C. and at a relative humidity of 0%. Typically, the film sample area used for OTR testing was 100 cm². However, for barrier testing of films where there is a limited amount of sample, an aluminum foil mask is used to reduce the testing area. When using the mask, the testing area is reduced to 5 cm². The foil mask had adhesive on one side to which the sample was attached. A second foil was then attached to the first to ensure a leak free seal. The carrier gas used was 2% hydrogen gas in a balance of nitrogen gas and the test gas was ultra high purity oxygen. The OTR of the compression molded films were tested at the corresponding film thickness as obtained from the compression molding process. However, in order to compare different samples, the resulting OTR values (in units of cm³/100 in²/day) have been normalized to a film thickness value of 1 mil.

Determination of the Water Vapor Transmission Rate (WVTR) of a Compression Molded Film Using a Masking Method The water vapor transmission rate (WVTR) of the compression-molded film was tested using a PERMATRAN® 3/34 instrument manufactured by MOCON Inc, Minneapolis, Minnesota, USA using a version of ASTM D3985. The instrument has two test cells (A and B) and each film sample was analyzed in duplicate. The WVTR result reported is the average of the results from these two test cells (A and B). The test is carried out at a temperature of 37.8° C. and at a relative humidity of 100%. Typically, the film sample area used for WVTR testing was 50 cm². However, for barrier testing of films where there was a limited amount of sample, an aluminum foil mask was used to reduce the testing area. When using the mask, the testing area was reduced to 5 cm². The foil mask has adhesive on one side to which the sample was attached. A second foil was then attached to the first to ensure a leak free seal. The carrier gas used was ultra high purity nitrogen gas and the test gas is water vapor at 100% relative humidity. The WVTR of the compression molded films were tested at the corresponding film thickness as obtained from the compression molding process. However, in order to compare different samples, the resulting WVTR values (in units of grams/100 in²/day) have been normalized to a film thickness value of 1 mil.

The barrier properties (OTR and WVTR) of pressed films made from comparative and inventive polyethylene compositions are provided in Table 5.

TABLE 5

OTR and WVTR Properties of Compression Molded Films

| Example No. | Inv. 1 | Inv. 1* | Inv. 2 | Inv. 2* | Comp. 3 | Comp. 4 |
|---|---|---|---|---|---|---|
| WTR-thickness (mil) | 2.5 | 2.2 | 2.4 | 1.5 | 2.7 | 2.4 |
| VTR g/100 IN²/Day (relative humidity = 100%, 37.8° C., atm) | 0.1036 | 0.0773 | 0.0949 | 0.0865 | 0.0478 | 0.0617 |
| WTR in g/100 IN²/Day-normalized thickness (1 mil) | 0.2590 | 0.1701 | 0.2278 | 0.1298 | 0.1291 | 0.1481 |
| OTR-thickness (mil) | 2.5 | 2.2 | 2.4 | 1.5 | 2.7 | 2.4 |
| OTR in CC/100 IN²/Day (relative humidity = 0%, 23° C., atm) | 31.93 | 29.4 | 31.22 | 28.79 | 21.14 | 28.45 |
| OTR in CC/100 IN²/Day-normalized thickness (1 mil) | 79.83 | 64.68 | 74.93 | 43.19 | 57.08 | 68.28 |

Figure 2:
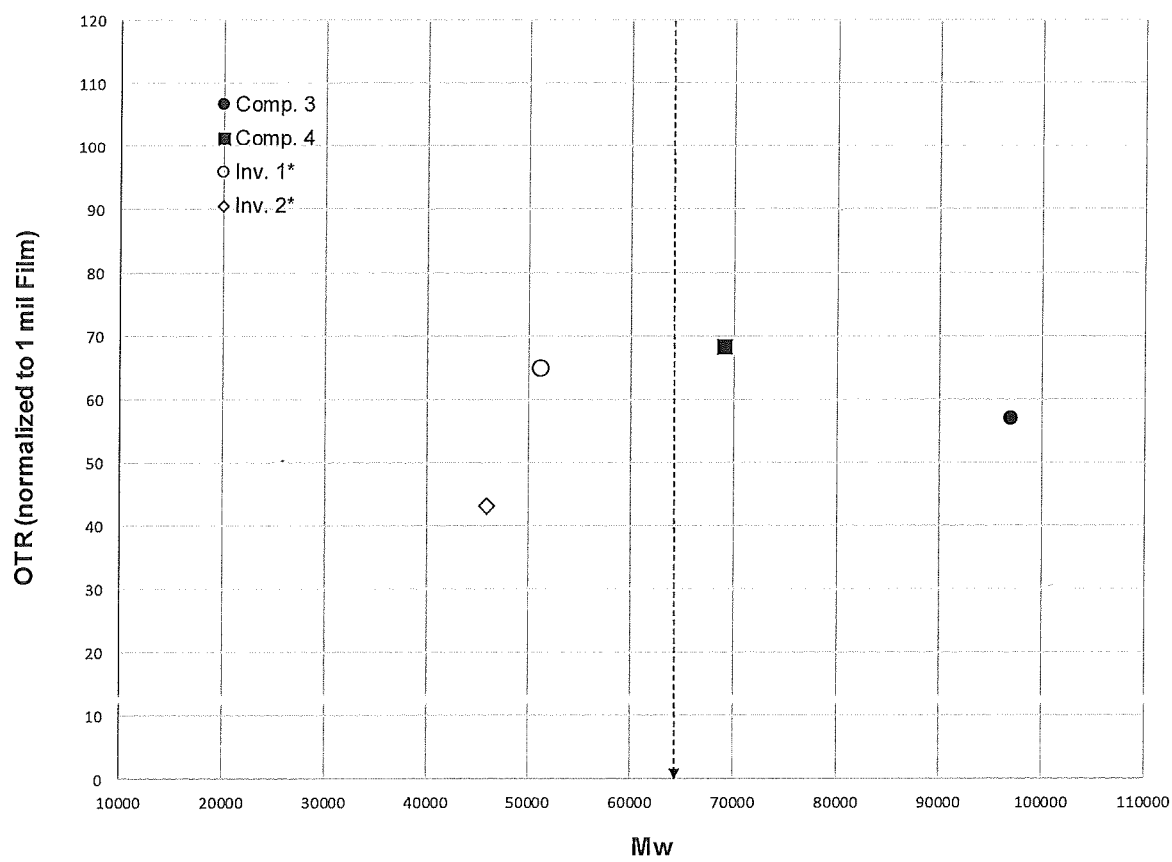
FIG. 2 shows the oxygen transmission rates (OTR) of compression molded films made from nucleated polyethylene compositions (Examples 1* and 2*) according to the present disclosure vs. the weight average molecular weight (Mw) of the nucleated polyethylene compositions (Examples 1* and 2*).
Figure 3:
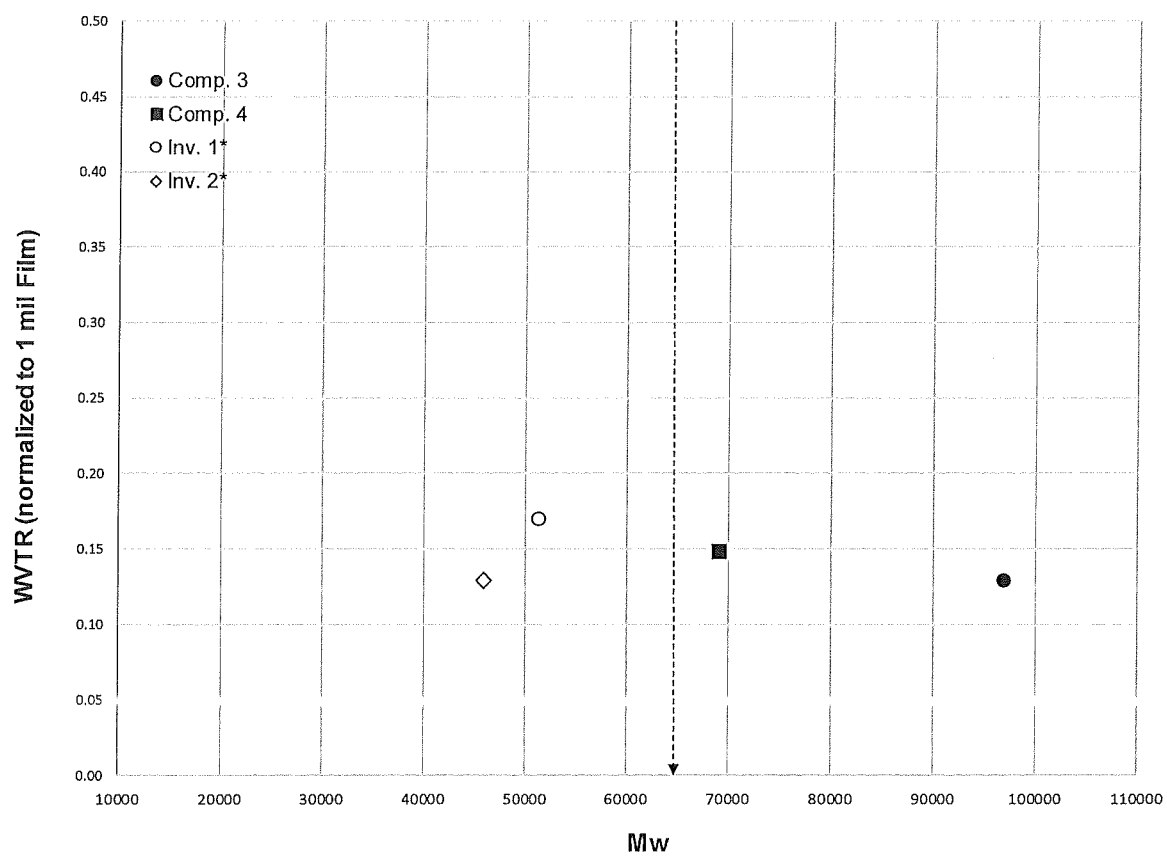
FIG. 3 shows the water vapor transmission rates (WVTR) of compression molded films made from nucleated polyethylene compositions (Examples 1* and 2*) according to the present disclosure vs. the weight average molecular weight (Mw) of the nucleated polyethylene compositions (Examples 1* and 2*).

As can been seen from the data in Table 5, as well as FIGS. 2 and 3, the films made from the nucleated inventive compositions (Examples 1* and 2*) had OTR and WVTR values which were comparable to films made from the comparative compositions when similarly nucleated (Examples 3 and 4), even though the inventive resins had higher melt indexes (i.e. lower molecular weights). Indeed, film made from inventive Example 2* had superior (i.e. lower)

OTR values than film made from the comparative compositions (Examples 3 and 4). Higher melt indices are useful for cast film production as it helps with processability and production line times.

Method of Making a Closure by Injection Molding

Nucleated versions of the Inventive homopolymer compositions as well as the comparative resins were made into closures using an injection molding process. A Sumitomo injection molding machine and 2.15-gram PCO (plastic closure only) 1881 carbonated soft drink (CSD) closure mold was used to prepare the closures herein. A Sumitomo injection molding machine (model SE75EV C250M) having a 28 mm screw diameter was used. The 4-cavity CSD closure mold was manufactured by Z-moulds (Austria). The 2.15-gram PCO 1881 CSD closure design was developed by Universal Closures Ltd. (United Kingdom). During the closure manufacturing, four closure parameters, the diameter of the top of the cap, the bore seal diameter, the tamper band diameter and the overall cap height, were measured and ensured to be within quality-control specifications.

An International Society of Beverage Technologists (ISBT) voluntary standard test method was used to determine the closure dimensions. The test used involves the selection of a mold cavity and the measurements on at least 5 closures made from that particular cavity. At least 14 dimensional measurements were obtained from closures that were aged for at least 1 week from the date of production. The closure dimension measurements were performed using a Vision Engineering, Swift Duo dual optical and video measuring system. All measurements were taken using 10× magnification and utilizing METLOGIX® M video measuring system software (see METLOGIX $M^3$: Digital Comparator Field of View Software, User's Guide).

The closures were formed by injection molding, and the injection-molding processing conditions are given in Table 6.

TABLE 6

Injection Molding Processing Conditions

| | Example No. | | | |
|---|---|---|---|---|
| | Inv. 1* | Inv. 2* | Comp. 3 | Comp. 4 |
| Closure No. | 1 | 2 | 3 | 4 |
| Additives (Color & Formulation) | Natural | Natural | Red | Red |
| Part Weight (g) | 8.6 | 8.6 | 8.6 | 8.6 |
| Injection Speed (mm/s) | 45 | 45 | 125 | 125 |
| Cycle time (s) | 4.09 | 4.34 | 4.12 | 3.65 |
| Filling time (s) | 0.639 | 0.617 | 0.245 | 0.245 |
| Dosing time (s) | 1.814 | 1.78 | 1.99 | 1.82 |
| Minimum Cushion (mm) | 9.76 | 9.76 | 9.93 | 9.93 |
| Filling peak pressure (psi) | 8660 | 7087 | 13829 | 14309 |
| Full peak pressure (psi) | 8670 | 7095 | 13829 | 14309 |
| Hold end position (mm) | 12.39 | 11.53 | 11.65 | 11.44 |
| Hold Pressure Setpoint (Psi) | 2050 | 2000 | 4350 | 5700 |
| Clamp force (ton) | 20 | 20 | 19.78 | 19.70 |
| Fill start position (mm) | 38.49 | 37.51 | 40.43 | 40.43 |
| Dosing back pressure (psi) | 833 | 830 | 822 | 833 |
| Pack pressure (psi) | 8662 | 7038 | 13752 | 14222 |
| Filling time 1 (s) | 0.64 | 0.616 | 0.248 | 0.248 |
| Temperature zone 1 (° C.) | 180 | 180 | 210 | 180 |
| Temperature zone 2 (° C.) | 185 | 185 | 215 | 185 |
| Temperature zone 3 (° C.) | 190 | 190 | 220 | 190 |
| Temperature zone 4 (° C.) | 200 | 200 | 230 | 200 |
| Temperature zone 5 (° C.) | 200 | 200 | 230 | 200 |
| Mold temperature stationary (° C.) | 10 | 10 | 10 | 10 |

Oxygen Transmission Rate (OTR) of an Injection Molded Closure

To measure the oxygen transmission rate through a closure ASTM D3985 (Standard Test Method for Oxygen Gas Transmission Rate Through Plastic Film and Sheeting Using a Coulometric Sensor) was adapted as follows.

First the closure's tamper evident band removed. Next, the bottom edge of the closure was lightly roughed with sandpaper (for better adhesion to the epoxy) and then the closure was epoxied (using DEVCON® 2 part epoxy) to a testing plate so as to cover an outlet tube (for sweep gas) and inlet tube for $N_2$ introduction. The epoxy was allowed to dry overnight. One of the two gas tubes protruding into the closure interior carries inlet nitrogen gas flowing into the closure interior (nitrogen feed line), while the other one carries sweep gas (e.g. nitrogen plus permeates from the atmosphere surrounding the closure) out of the closure interior and into a detector. If any oxygen present in the atmosphere is permeating the closure walls it is detected as a component within the $N_2$ exiting the closure interior as sweep gas. The plate/closure/tubing apparatus is connected to an OX-TRAN low range instrument (PERMATRAN-C® Model 2/21 MD) with the testing plate placed in an environmental chamber controlled at a temperature of 23° C. A baseline measurement for the detection of atmospheric oxygen is also taken by using an impermeable aluminum foil (in parallel with the closure) for a side by side comparison of permeability. The oxygen permeability of the closure is reported as the average oxygen transmission rate in units of $cm^3$/closure/day.

The oxygen barrier properties of injected molded closures made from comparative and inventive polyethylene homopolymer compositions, all of which were nucleated are provided in Table 7.

TABLE 7

| Example No. | Closure No. | OTR Average ($cm^3$/closure/day) | Test Gas |
|---|---|---|---|
| Inv. 1* | 1 | 0.0012 | ambient air (20.9% oxygen) |
| Inv. 2* | 2 | 0.0009 | ambient air (20.9% oxygen) |
| Comp. 3 | 5 | 0.0012 | ambient air (20.9% oxygen) |
| Comp. 4 | 6 | 0.0017 | ambient air (20.9% oxygen) |

Figure 4:
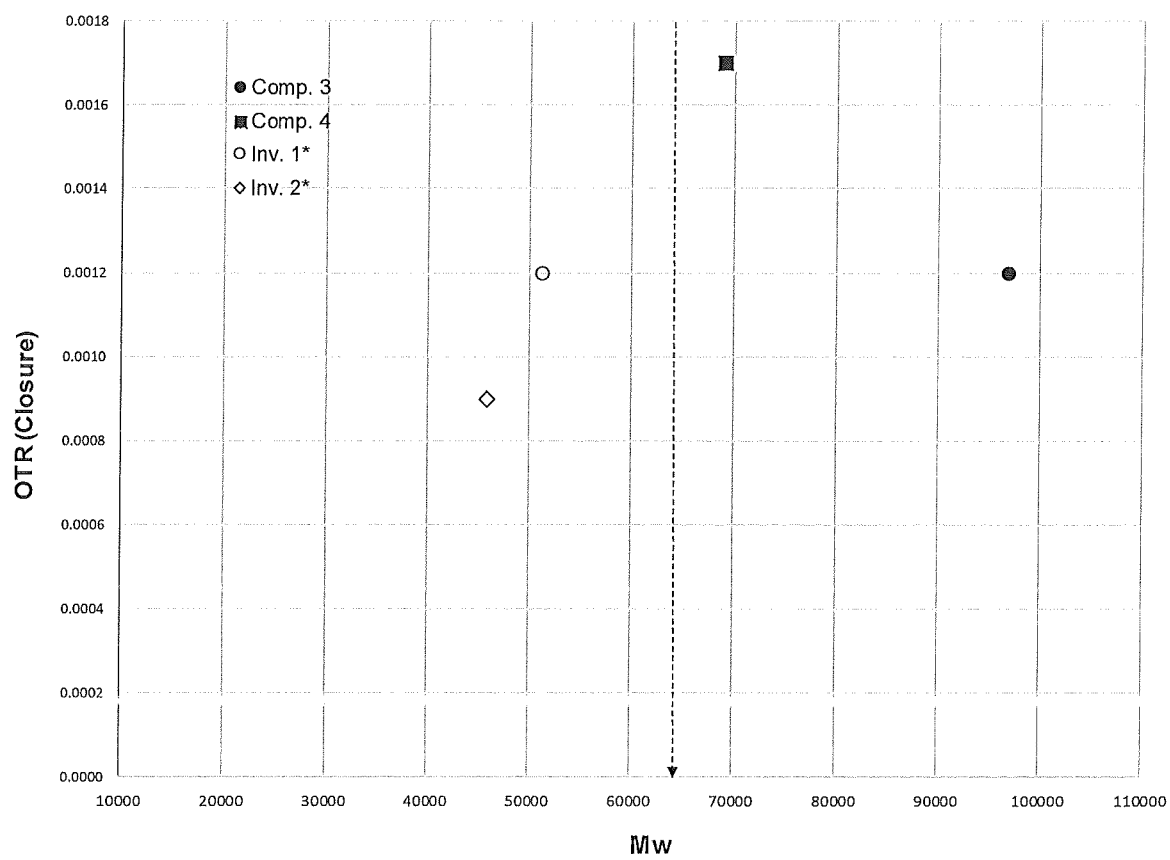
FIG. 4 shows the oxygen transmission rates (OTR) of injection molded closures made from nucleated polyethylene compositions (Examples 1* and 2*) according to the present disclosure vs. the weight average molecular weight (Mw) of the nucleated polyethylene compositions (Examples 1* and 2*).

As can been seen from the data in Table 7 and FIG. 4, the closures made from the inventive resins had OTR values which were comparable to or better than closures made from the comparative resins which were similarly nucleated, even though the inventive resins have higher melt indexes (i.e. lower molecular weights). Higher melt indices are useful for caps and closures production as it helps with production line cycle times, especially during the production of injection molded closures. Also, the relatively low OTR values provide advantages in the manufacture of articles which may benefit from good barrier properties, such as for example a cap or closure for a bottle, container or the like or a fitment for a pouch or the like.

INDUSTRIAL APPLICABILITY

The present disclosure provides polyethylene homopolymer compositions which have good barrier properties, and which can be used to manufacture films or molded articles such as a closure for bottles.

The invention claimed is:

1. A polyethylene homopolymer composition, the polyethylene homopolymer composition comprising:
   (1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and
   (2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0;
   wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0.

2. The polyethylene homopolymer composition of claim 1 wherein the ratio of the melt index, $I_2^2$ of the second ethylene homopolymer to the melt index, $I_2^1$ of the first ethylene homopolymer is at least 100.

3. The polyethylene homopolymer composition of claim 1 wherein the ratio of the melt index, $I_2^2$ of the second ethylene homopolymer to the melt index, $I_2^1$ of the first ethylene homopolymer is at least 1000.

4. The polyethylene homopolymer composition of claim 1 wherein the ratio of the melt index, $I_2^2$ of the second ethylene homopolymer to the melt index, $I_2^1$ of the first ethylene homopolymer is at least 5000.

5. The polyethylene homopolymer composition of claim 1 wherein the density, $d^2$ of the second ethylene homopolymer is higher than the density, $d^1$ of the first ethylene homopolymer.

6. The polyethylene homopolymer composition of claim 5 wherein the density, $d^2$ of the second ethylene homopolymer is less than 0.035 g/cm$^3$ higher than the density, $d^1$ of the first ethylene homopolymer.

7. The polyethylene homopolymer composition of claim 5 wherein the density, $d^2$ of the second ethylene homopolymer is less than 0.030 g/cm$^3$ higher than the density, $d^1$ of the first ethylene homopolymer.

8. The polyethylene homopolymer composition of claim 1 wherein the first ethylene homopolymer has a density, $d^1$ of from 0.946 to 0.965 g/cm$^3$.

9. The polyethylene homopolymer composition of claim 1 wherein the second ethylene homopolymer has a density, $d^2$ of from 0.955 to 0.980 g/cm$^3$.

10. The polyethylene homopolymer composition of claim 1 wherein the first and second ethylene homopolymers each has a molecular weight distribution, Mw/Mn of less than 2.5.

11. The polyethylene homopolymer composition of claim 1 wherein the first and second ethylene homopolymers are made with a single site catalyst.

12. The polyethylene homopolymer composition of claim 1 wherein the polyethylene homopolymer composition has a density of from 0.950 to 0.980 g/cm$^3$.

13. The polyethylene homopolymer composition of claim 1 wherein the polyethylene homopolymer composition has a density of from 0.961 to 0.975 g/cm$^3$.

14. The polyethylene homopolymer composition of claim 1 wherein the polyethylene homopolymer composition has a high load melt index, $I_{21}$ of greater than 300.

15. The polyethylene homopolymer composition of claim 1 wherein the polyethylene homopolymer composition has a melt index, $I_2$ of ≥3 g/10 min.

16. The polyethylene homopolymer composition of claim 1 wherein the polyethylene homopolymer composition has a melt index, $I_2$ of from 5 to 40 g/10 min.

17. The polyethylene homopolymer composition of claim 1 wherein the polyethylene homopolymer composition has a molecular weight distribution, $M_w/M_n$ of from 4.0 to 10.0.

18. The polyethylene homopolymer composition of claim 1 wherein the polyethylene homopolymer composition has a bimodal profile in a GPC chromatograph.

19. The polyethylene homopolymer composition of claim 1 wherein the polyethylene composition has a weight average molecular weight, $M_w$ of less than 70,000.

20. The polyethylene homopolymer composition of claim 1 wherein the polyethylene homopolymer composition has a weight average molecular weight, $M_w$ of ≤65,000.

21. The polyethylene homopolymer composition of claim 1 wherein the polyethylene homopolymer composition has a number average molecular weight, $M_n$ of less than 20,000.

22. The polyethylene homopolymer composition of claim 1 wherein the polyethylene homopolymer composition has a melt flow ratio, $I_{21}/I_2$ of less than 45.

23. The polyethylene homopolymer composition of claim 1 wherein the polyethylene homopolymer composition has a hexane extractables value of less than 2 wt %.

24. The polyethylene homopolymer composition of claim 1 wherein the polyethylene homopolymer composition further comprises a nucleating agent.

25. The polyethylene homopolymer composition of claim 24 wherein the nucleating agent is a salt of a dicarboxylic acid compound.

26. The polyethylene homopolymer composition of claim 24 wherein the polyethylene homopolymer composition comprises from 20 to 4000 ppm of the nucleating agent based on the combined weight of the first ethylene homopolymer and the second ethylene homopolymer.

27. An injection molded article comprising the polyethylene homopolymer composition of claim 1.

28. A compression molded article comprising the polyethylene homopolymer composition of claim 1.

29. A closure comprising the polyethylene homopolymer composition of claim 1.

30. A film comprising the polyethylene homopolymer composition of claim 1.

31. A cast film comprising the polyethylene homopolymer composition of claim 1.

32. The polyethylene homopolymer composition of claim 1,
   wherein the polyethylene homopolymer composition is made by a process comprising contacting at least one single site polymerization catalyst system with ethylene under solution polymerization conditions in at least two polymerization reactors.

33. A process to prepare a polyethylene homopolymer composition, the polyethylene homopolymer composition comprising:
   (1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and
   (2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0;
   wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0;

the process comprising contacting at least one single site polymerization catalyst system with ethylene under solution polymerization conditions in at least two polymerization reactors.

34. The process of claim 33 wherein the at least two polymerization reactors comprise a first reactor and a second reactor configured in series.

35. A polymer composition comprising from 1 to 100 percent by weight of a polyethylene homopolymer composition, the polyethylene homopolymer composition comprising:
(1) 10 to 90 weight % of a first ethylene homopolymer having a density, $d^1$ of from 0.943 to 0.975 g/cm$^3$, a melt index, $I_2^1$ of from 0.01 to 10 g/10 min, and a molecular weight distribution, Mw/Mn of less than 3.0; and
(2) 90 to 10 weight % of a second ethylene homopolymer having a density, $d^2$ of from 0.950 to 0.985 g/cm$^3$, a melt index, $I_2^2$ of at least 500 g/10 min, and a molecular weight distribution, $M_w/M_n$ of less than 3.0;
wherein the ratio of the melt index, $I_2^2$ of the second ethylene homopolymer to the melt index, $I_2^1$ of the first ethylene homopolymer is at least 50, and wherein the polyethylene homopolymer composition has a weight average molecular weight, $M_w$ of ≤75,000, a high load melt index, $I_{21}$ of at least 200 g/10 min, and a molecular weight distribution, $M_w/M_n$ of from 4.0 to 12.0.

36. The polymer composition of claim 35 wherein the polyethylene homopolymer composition further comprises a nucleating agent.

37. The polymer composition of claim 36 wherein the wherein the nucleating agent is a salt of a dicarboxylic acid compound.

38. The polymer composition of claim 37 wherein the polyethylene homopolymer composition comprises from 20 to 4000 ppm of the nucleating agent based on the combined weight of the first ethylene homopolymer and the second ethylene homopolymer.

39. The polyethylene homopolymer composition of claim 24, which when made into a PCO 1881 CSD closure, has an OTR of less than 0.0025 cm$^3$/closure/day.

40. A film comprising the polyethylene homopolymer composition of claim 24 and a having a normalized OTR of ≤80 cm$^3$/100 in$^2$/day.

41. A film comprising the polyethylene homopolymer composition of claim 24 and having a normalized WVTR of ≤0.250 g/100 in$^2$/day.

* * * * *